(12) United States Patent
Lee et al.

(10) Patent No.: US 12,157,683 B2
(45) Date of Patent: Dec. 3, 2024

(54) COMPOSITE MATERIAL AND A WATER PURIFYING SYSTEM

(71) Applicant: City University of Hong Kong, Kowloon (HK)

(72) Inventors: Chun-Sing Lee, Kowloon (HK); Shengliang Li, Kowloon (HK); Zhongming Huang, Kowloon (HK); Yingpeng Wan, Kowloon (HK)

(73) Assignee: City University of Hong Kong, Kowloon (HK)

( * ) Notice: Subject to any disclaimer, the term of this patent is extended or adjusted under 35 U.S.C. 154(b) by 421 days.

(21) Appl. No.: 17/570,756

(22) Filed: Jan. 7, 2022

(65) Prior Publication Data
US 2022/0220008 A1     Jul. 14, 2022

Related U.S. Application Data

(60) Provisional application No. 63/135,798, filed on Jan. 11, 2021.

(51) Int. Cl.
    *C02F 1/28*           (2023.01)
    *B01D 1/00*          (2006.01)
    (Continued)

(52) U.S. Cl.
    CPC ............ *C02F 1/288* (2013.01); *B01D 1/0035* (2013.01); *B01J 20/20* (2013.01); *B01J 20/261* (2013.01);
    (Continued)

(58) Field of Classification Search
    CPC .. C02F 1/288; C02F 1/048; C02F 1/14; C02F 1/283; C02F 1/285; C02F 2101/20;
    (Continued)

(56) References Cited

U.S. PATENT DOCUMENTS

| | | | |
|---|---|---|---|
| 8,927,079 B2 * | 1/2015 | Leventis | ............ C08G 18/7893 |
| | | | 428/36.5 |
| 2011/0301399 A1 * | 12/2011 | Perlman | ................ C02F 11/008 |
| | | | 588/2 |

(Continued)

FOREIGN PATENT DOCUMENTS

| | | | | |
|---|---|---|---|---|
| CN | 108503880 A | * | 9/2018 | .............. B01J 13/02 |
| CN | 109354091 A | * | 2/2019 | ............ B01J 20/048 |

(Continued)

OTHER PUBLICATIONS

English translation of Patent Publication Cao CN-108503880-A, published Sep. 2018. (Year: 2018).*

(Continued)

*Primary Examiner* — Joseph W Drodge
(74) *Attorney, Agent, or Firm* — Renner, Kenner, Greive, Bobak, Taylor & Weber

(57) ABSTRACT

A composite material for floating on a contaminated water source, including: A) a polymeric structure having a network of interconnected porous channels; and B) a carbonous material dispersed within the polymeric structure, the carbonous material has a functionalized surface. The composite material has a density of less than 1 g/cm³, and the contaminated water source contains a low-boiling-point contaminant. The polymeric structure draws contaminated water from the contaminated water source into the polymeric structure via capillary action, and the functionalized surface removes the low-boiling point contaminant from the contaminated water. A method of purifying water using the composite material as mentioned herein and a kit for harvesting purified water including the composite material as mentioned herein.

19 Claims, 42 Drawing Sheets

(51) Int. Cl.
   *B01J 20/20* (2006.01)
   *B01J 20/26* (2006.01)
   *B01J 20/28* (2006.01)
   *C02F 1/04* (2023.01)
   *C02F 1/14* (2023.01)
   *C02F 1/48* (2023.01)
   *C02F 101/20* (2006.01)
   *C02F 101/30* (2006.01)

(52) U.S. Cl.
   CPC ... *B01J 20/28011* (2013.01); *B01J 20/28047* (2013.01); *B01J 20/28059* (2013.01); *B01J 20/28085* (2013.01); *B01J 20/28092* (2013.01); *C02F 1/048* (2013.01); *C02F 1/14* (2013.01); *B01J 2220/46* (2013.01); *C02F 1/283* (2013.01); *C02F 1/285* (2013.01); *C02F 2101/20* (2013.01); *C02F 2101/308* (2013.01)

(58) Field of Classification Search
   CPC .......... C02F 2101/308; C02F 2101/306; C02F 2101/322; B01D 1/0035; B01J 20/20; B01J 20/261; B01J 20/28011; B01J 20/28047; B01J 20/28059; B01J 20/28085; B01J 20/28092; B01J 2220/46; B01J 20/32; B01J 20/3202; B01J 20/3204; B01J 20/3208; B01B 1/005
   See application file for complete search history.

(56) References Cited

U.S. PATENT DOCUMENTS

| | | | | |
|---|---|---|---|---|
| 2016/0175812 | A1* | 6/2016 | Mohammed | C02F 1/286 210/660 |
| 2017/0182474 | A1* | 6/2017 | Zhamu | B01J 20/20 |
| 2019/0240642 | A1* | 8/2019 | Al Hamouz | C02F 1/288 |
| 2021/0170360 | A1* | 6/2021 | Lu | B01J 20/265 |

FOREIGN PATENT DOCUMENTS

| | | | | |
|---|---|---|---|---|
| CN | 110496609 A | * | 11/2019 | ............ B01J 20/048 |
| WO | WO-0181249 A1 | * | 11/2001 | ............ B01D 39/16 |
| WO | WO-2020236909 A1 | * | 11/2020 | ........... B01D 1/0035 |

OTHER PUBLICATIONS

English translation of Zhang Publication CN-109354091-A, published Feb. 19, 2019. (Year: 2019).*
English translation of Cui Publication CN-109354091-A, published Nov. 26, 2019. (Year: 2019).*
Yanan Liu, et al., 2D Heterostructure Membranes with Sunlight-Driven Self-Cleaning Ability for Highly Efficient Oil-Water Separation, Adv. Funct. Mater.28 (2018) 1706545.
Chao Li, et al., Ultralight Multifunctional Carbon-Based Aerogels by Combining Graphene Oxide and Bacterial Cellulose, Small 13(2017) 1700453.
Xin Gao, et al., Robust Superhydrophobic Foam: A Graphdiyne-Based Hierarchical Architecture for Oil/Water Separation, Adv. Mater. 28 (2016)168-173.
Yanming Xue, et al., Multifunctional Superelastic Foam-Like Boron Nitride Nanotubular Cellular-Network Architectures, ACS Nano 11 (2017) 558-568.
Xin Wang, et al., Scalable Template Synthesis of Resorcinol-Formaldehyde/Graphene Oxide Composite Aerogels with Tunable Densities and Mechanical Properties, Angew. Chem. Inte.r Ed. 54 (2015) 2397-2401.
Hai-Wei Liang, et al., Macroscopic-Scale Template Synthesis of Robust Carbonaceous Nanofiber Hydrogels and Aerogels and Their Applications, Angew. Chem. Inte.r Ed. 51 (2012) 5101-5105.
George Ni, et al., A salt-rejecting floating solar still for low-cost desalination, Energy Environ. Sci. 11 (2018) 1510-1519.
Wendong Wang, et al., Dynamic and programmable self-assembly of micro-rafts at the air-water interface, Sci. Adv. 3 (2017) 1602522-1602530.
Huaying Ren, et al., Hierarchical Graphene Foam for Efficient Omnidirectional Solar—Thermal Energy Conversion, Adv. Mater. 29 (2017) 1702590-1702596.
Xiuqiang Li, et al., Graphene oxide-based efficient and scalable solar desalination under one sun with a confined 2D water path, Proc. Natl. Acad. Sci. U. S. A 113 (2016)13953-3958.
George Ni, et al., Steam generation under one sun enabled by a floating structure with thermal concentration, Nat. Energy 1 (2016) 16126-16127.
Xu Wang, et al., Multilayer Polypyrrole Nanosheets with Self-Organized Surface Structures for Flexible and Efficient Solar—Thermal Energy Conversion, Adv. Mater. 31 (2019) 1807716-1807724.
Weigu Li, et al., Portable Low-Pressure Solar Steaming-Collection Unisystem with Polypyrrole Origamis, Adv. Mater. 31 (2019) 1900720-1900726.
Xiaofeng Lin, et al., Integrative solar absorbers for highly efficient solar steam generation, J. Mater. Chem. A 6 (2018) 4642-4648.
Feng (Frank) Gong, et al., Scalable, eco-friendly and ultrafast solar steam generators based on one-step melamine-derived carbon sponges toward water purification, Nano Energy 58 (2019) 322-330.
Luocai Yi, et al., Scalable and low-cost synthesis of black amorphous Al—Ti—O nanostructure for high-efficient photothermal desalination, Nano Energy 41 (2017) 600-608.
Wei Huang, et al., Three-dimensional hierarchical CuxS-based evaporator for high-efficiency multifunctional solar distillation, Nano Energy 69 (2020) 104465.
Chenwei Li, et al., Scalable and robust bilayer polymer foams for highly efficient and stable solar desalination, Nano Energy 60 (2019) 841-849.
Xiaoying Song, et al., Omnidirectional and effective salt-rejecting absorber with rationally designed nanoarchitecture for efficient and durable solar vapour generation, J. Mater. Chem. A 6 (2018) 22976-22986.
Renyuan Li, et al., Improving atmospheric water production yield: Enabling multiple water harvesting cycles with nano sorbent, Nano Energy 67 (2020), 104255.
Youhong Guo, et al., Tailoring surface wetting states for ultrafast solar-driven water evaporation, Energy Environ. Sci., 13 (2020) 2087-2095.
Elimelech, M.; Phillip, W. A. The Future of Seawater Desalination: Energy, Technology, and the Environment. Science 2011, 333, 712-717.
Zhou, X.; Guo, Y.; Zhao, F.; Yu, G. Hydrogels as an Emerging Material Platform for Solar Water Purification. Acc. Chem. Res. 2019, 52, 3244-3253.
Novais, R. M.; Caetano, A. P. F.; Seabra, M. P.; Labrincha, J. A.; Pullar, R. C. Extremely Fast and Efficient Methylene Blue Adsorption using Eco-friendly Cork and Paper Waste-based Activated Carbon Adsorbents. J. Cleaner Prod. 2018, 197, 1137-1147.
Alvarez, P. J. J.; Chan, C. K.; Elimelech, M.; Halas, N. J.; Villagrán, D. Emerging Opportunities for Nanotechnology to Enhance Water Security. Nat. Nanotechnol. 2018, 13, 634-641.
Huang, Z.; Li, S.; Cui, X.; Wan, Y.; Xiao, Y.; Tian, S.; Wang, H.; Li, X.; Zhao, Q.; Lee, C.-S. A Broadband Aggregation-Independent Plasmonic Absorber for Highly Efficient Solar Steam Generation. J. Mater. Chem. A 2020, 8, 10742-10746.
Fang, Q.; Li, T.; Lin, H.; Jiang, R.; Liu, F. Highly Efficient Solar Steam Generation from Activated Carbon Fiber Cloth with Matching Water Supply and Durable Fouling Resistance. ACS Appl. Energy Mater. 2019, 2, 4354-4361.
Zhou, J.; Gu, Y.; Liu, P.; Wang, P.; Miao, L.; Liu, J.; Wei, A.; Mu, X.; Li, J.; Zhu, J. Development and Evolution of the System Structure for Highly Efficient Solar Steam Generation from Zero to Three Dimensions. Adv. Funct. Mater. 2019, 29, 1903255.
Hu, X.; Xu, W.; Zhou, L.; Tan, Y.; Wang, Y.; Zhu, S.; Zhu, J. Tailoring Graphene Oxide-Based Aerogels for Efficient Solar Steam Generation under One Sun. Adv. Mater. 2017, 29, 1604031.

(56) References Cited

OTHER PUBLICATIONS

Li, J.; Wang, X.; Lin, Z.; Xu, N.; Li, X.; Liang, J.; Zhao, W.; Lin, R.; Zhu, B.; Liu, G.; Zhou, L.; Zhu, S.; Zhu, J. Over 10 kg m-2 h-1 Evaporation Rate Enabled by a 3D Interconnected Porous Carbon Foam. Joule 2020, 4, 928-937.
Li, X.; Li, J.; Lu, J.; Xu, N.; Chen, C.; Min, X.; Zhu, B.; Li, H.; Zhou, L.; Zhu, S.; Zhang, T.; Zhu, J. Enhancement of Interfacial Solar Vapor Generation by Environmental Energy. Joule 2018, 2, 1331-1338.
Liu, Z.; Yang, Z.; Huang, X.; Xuan, C.; Xie, J.; Fu, H.; Wu, Q.; Zhang, J.; Zhou, X.; Liu, Y. High-Absorption Recyclable Photothermal Membranes Used in a Bionic System for High-efficiency Solar Desalination via Enhanced Localized Heating. J. Mater. Chem. A 2017, 5, 20044-20052.
Yuan, Y.; Dong, C.; Gu, J.; Liu, Q.; Xu, J.; Zhou, C.; Song, G.; Chen, W.; Yao, L.; Zhang, D. A Scalable Nickel-Cellulose Hybrid Metamaterial with Broadband Light Absorption for Efficient Solar Distillation. Adv. Mater. 2020, 32, 1907975.
Gao, M.; Zhu, L.; Peh, C. K.; Ho, G. W. Solar Absorber Material and System Designs for Photothermal Water Vaporization towards Clean Water and Energy Production. Energy Environ. Sci. 2019, 12, 841-864.
Zhu, L.; Gao, M.; Peh, C. K. N.; Wang, X.; Ho, G. W. Self-Contained Monolithic Carbon Sponges for Solar-Driven Interfacial Water Evaporation Distillation and Electricity Generation. Adv. Energy Mater. 2018, 8, 1702149.
Nandakumar, D. K.; Zhang, Y.; Ravi, S. K.; Guo, N.; Zhang, C.; Tan, S. C. Solar Energy Triggered Clean Water Harvesting from Humid Air Existing above Sea Surface Enabled by a Hydrogel with Ultrahigh Hygroscopicity. Adv. Mater. 2019, 31, 1806730.
Politano, A.; Argurio, P.; Di Profio, G.; Sanna, V.; Cupolillo, A.; Chakraborty, S.; Arafat, H. A.; Curcio, E. Photothermal Membrane Distillation for Seawater Desalination. Adv. Mater. 2017, 29, 1603504.
Liu, Y.; Lou, J.; Ni, M.; Song, C.; Wu, J.; Dasgupta, N. P.; Tao, P.; Shang, W.; Deng, T. Bioinspired Bifunctional Membrane for Efficient Clean Water Generation. ACS Appl. Mater. Interfaces 2016, 8, 772-779.
Shi, L.; Shi, Y.; Zhuo, S.; Zhang, C.; Aldrees, Y.; Aleid, S.; Wang, P. Multi-functional 3D Honeycomb Ceramic Plate for Clean Water Production by Heterogeneous Photo-Fenton Reaction and Solar-driven Water Evaporation. Nano Energy 2019, 60, 222-230.
Wu, D.; Qu, D.; Jiang, W.; Chen, G.; An, L.; Zhuang, C.; Sun, Z. Self-floating Nanostructured Ni—NiOx/Ni Foam for Solar Thermal Water Evaporation. J. Mater. Chem. A 2019, 7, 8485-8490.
Guo, Y.; Lu, H.; Zhao, F.; Zhou, X.; Shi, W.; Yu, G. Biomass-Derived Hybrid Hydrogel Evaporators for Cost-Effective Solar Water Purification. Adv. Mater. 2020, 32, 1907061.
Shao, B.; Wang, Y.; Wu, X.; Lu, Y.; Yang, X.; Chen, G. Y.; Owens, G.; Xu, H. Stackable Nickel-cobalt@polydopamine Nano-sheet Based Photothermal Sponges for Highly Efficient Solar Steam Generation. J. Mater. Chem. A 2020, 8, 11665-11673.
Zhao, F.; Zhou, X.; Shi, Y.; Qian, X.; Alexander, M.; Zhao, X.; Mendez, S.; Yang, R.; Qu, L.; Yu, G. Highly Efficient Solar Vapour Generation via Hierarchically Nanostructured Gels. Nat. Nanotechnol. 2018, 13, 489-495.
Chang, C.; Tao, P.; Xu, J.; Fu, B.; Song, C.; Wu, J.; Shang, W.; Deng, T. High-Efficiency Superheated Steam Generation for Portable Sterilization under Ambient Pressure and Low Solar Flux. ACS Appl. Mater. Interfaces 2019, 11, 18466-18474.
Ma, Q.; Yin, P.; Zhao, M.; Luo, Z.; Huang, Y.; He, Q.; Yu, Y.; Liu, Z.; Hu, Z.; Chen, B.; Zhang, H. MOF-Based HierarchicalStructures for Solar-Thermal Clean Water Production. Adv. Mater. 2019, 31, 1808249.
Zhou, L.; Tan, Y.; Wang, J.; Xu, W.; Yuan, Y.; Cai, W.; Zhu, S.; Zhu, J. 3D Self-assembly of Aluminium Nanoparticles for Plasmon-Enhanced Solar Desalination. Nat. Photonics 2016, 10, 393.
Li, J.; Du, M.; Lv, G.; Zhou, L.; Li, X.; Bertoluzzi, L.; Liu, C.; Zhu, S.; Zhu, J. Interfacial Solar Steam Generation Enables Fast-Responsive, Energy-Efficient, and Low-Cost Off-Grid Sterilization. Adv. Mater. 2018, 30, 1805159.
Wu, K.; Guo, J.; Wang, C. An Elastic Monolithic Catalyst: A Microporous Metalloporphyrin-Containing Framework-Wrapped Melamine Foam for Process-Intensified Acyl Transfer. Angew. Chem., Int. Ed. 2016, 55, 6013-6017.
Liu, J.; Liu, Q.; Ma, D.; Yuan, Y.; Yao, J.; Zhang, W.; Su, H.; Su, Y.; Gu, J.; Zhang, D. Simultaneously Achieving Thermal Insulation and Rapid Water Transport in Sugarcane Stems for Efficient Solar Steam Generation. J. Mater. Chem. A 2019, 7, 9034-9039.
Meng, S.; Zhao, X.; Tang, C.-Y.; Yu, P.; Bao, R.-Y.; Liu, Z.-Y.; Yang, M.-B.; Yang, W. A Bridge-Arched and Layer-structured Hollow Melamine Foam/reduced Graphene Oxide Composite with An Enlarged Evaporation Area and Superior Thermal Insulation for High-performance Solar Steam Generation. J. Mater. Chem. A 2020, 8, 2701-2711.
Deng, X.; Nie, Q.; Wu, Y.; Fang, H.; Zhang, P.; Xie, Y. Nitrogen-Doped Unusually Superwetting, Thermally Insulating, and Elastic Graphene Aerogel for Efficient Solar Steam Generation. ACS Appl. Mater. Interfaces 2020, 12, 26200-26212.
Moreno-Castilla, C.; Maldonado-Hódar, F. J. Carbon Aerogels for Catalysis Applications: An Overview. Carbon 2005, 43, 455-465.
Zhan, H.-J.; Chen, J.-F.; Zhao, H.-Y.; Jiao, L.; Liu, J.-W.; Yu, S.-H. Biomimetic Difunctional Carbon-Nanotube-Based Aerogels for Efficient Steam Generation. ACS Appl. Nano Mater. 2020, 3, 4690-4698.
Lu, Q.; Shi, W.; Yang, H.; Wang, X. Nanoconfined Water-Molecule Channels for High-Yield Solar Vapor Generation under Weaker Sunlight. Adv. Mater. 2020, 32, 2001544.
Li, H.; Wen, H.; Zhang, Z.; Song, N.; Kwok, R. T. K.; Lam, J. W. Y.; Wang, L.; Wang, D.; Tang, B. Z. Reverse Thinking of the Aggregation-Induced Emission Principle: Amplifying Molecular Motions to Boost Photothermal Efficiency of Nanofibers. Angew. Chem., Int. Ed. 2020, 59, 20371-20375.
Chen, G.; Sun, J.; Peng, Q.; Sun, Q.; Wang, G.; Cai, Y.; Gu, X.; Shuai, Z.; Tang, B. Z. Biradical-Featured Stable Organic-Small-Molecule Photothermal Materials for Highly Efficient Solar-Driven Water Evaporation. Adv. Mater. 2020, 32, 1908537.
Li, H.; Wen, H.; Li, J.; Huang, J.; Wang, D.; Tang, B. Z. Doping AIE Photothermal Molecule into All-Fiber Aerogel with Self-Pumping Water Function for Efficiency Solar Steam Generation. ACS Appl. Mater. Interfaces 2020, 12, 26033-26040.
Liu, Y.; Yu, S.; Feng, R.; Bernard, A.; Liu, Y.; Zhang, Y.; Duan, H.; Shang, W.; Tao, P.; Song, C.; Deng, T. A Bioinspired, Reusable, Paper-Based System for High-Performance Large-Scale Evaporation. Adv. Mater. 2015, 27, 2768-2774.
Liu, Y.; Lin, F. X.; Feng, Y.; Liu, X.; Wang, L.; Yu, Z.-Q.; Tang, B. Z. Shape-Persistent π-Conjugated Macrocycles with Aggregation-Induced Emission Property: Synthesis, Mechanofluorochromism, and Mercury (II) Detection. ACS Appl. Mater. Interfaces 2019, 11, 34232-34240.
Guo, Y.; Zhou, X.; Zhao, F.; Bae, J.; Rosenberger, B.; Yu, G. Synergistic Energy Nanoconfinement and Water Activation in Hydrogels for Efficient Solar Water Desalination. ACS Nano 2019, 13, 7913-7919.
Wang, W.; Shi, Y.; Zhang, C.; Hong, S.; Shi, L.; Chang, J.; Li, R.; Jin, Y.; Ong, C.; Zhuo, S.; Wang, P. Simultaneous Production of Fresh Water and Electricity via Multistage Solar Photovoltaic Membrane Distillation. Nat. Commun. 2019, 10, 3012.
Li, J.; Zhou, X.; Mu, P.; Wang, F.; Sun, H.; Zhu, Z.; Zhang, J.; Li, W.; Li, A. Ultralight Biomass Porous Foam with AlignedHierarchical Channels as Salt-Resistant Solar Steam Generators. ACS Appl. Mater. Interfaces 2020, 12, 798-806.
Cui, L.; Zhang, P.; Xiao, Y.; Liang, Y.; Liang, H.; Cheng, Z.; Qu, L. High Rate Production of Clean Water Based on the Combined Photo-Electro-Thermal Effect of Graphene Architecture. Adv. Mater. 2018, 30, 1706805.
Chen, T.; Wu, Z.; Liu, Z.; Aladejana, J. T.; Wang, X.; Niu, M.; Wei, Q.; Xie, Y. Hierarchical Porous Aluminophosphate-Treated Wood for High-Efficiency Solar Steam Generation. ACS Appl. Mater. Interfaces 2020, 12, 19511-19518.
Bae, K.; Kang, G.; Cho, S. K.; Park, W.; Kim, K.; Padilla, W. J. Flexible Thin-film Black Gold Membranes with Ultrabroadband Plasmonic Nanofocusing for Efficient Solar Vapour Generation. Nat. Commun. 2015, 6, 10103.

(56) References Cited

OTHER PUBLICATIONS

Zhang, L.; Tang, B.; Wu, J.; Li, R.; Wang, P. Hydrophobic Light-to-Heat Conversion Membranes with Self-Healing Ability for Interfacial Solar Heating. Adv. Mater. 2015, 27, 4889-4894.

Li, W.; Tekell, M. C.; Huang, Y.; Bertelsmann, K.; Lau, M.; Fan, D. Synergistic High-Rate Solar Steaming and Mercury Removal with MoS2/C @ Polyurethane Composite Sponges. Adv. Energy Mater. 2018, 8, 1802108.

Xie, Y.; Yan, B.; Xu, H.; Chen, J.; Liu, Q.; Deng, Y.; Zeng, H. Highly Regenerable Mussel-Inspired Fe3O4@Polydopamine-Ag Core-Shell Microspheres as Catalyst and Adsorbent for Methylene Blue Removal. ACS Appl. Mater. Interfaces 2014, 6, 8845-8852.

Jang, H.; Choi, J.; Lee, H.; Jeon, S. Corrugated Wood Fabricated Using Laser-Induced Graphitization for Salt-Resistant Solar Steam Generation. ACS Appl. Mater. Interfaces 2020, 12, 30320-30327.

Li, T.; Liu, H.; Zhao, X.; Chen, G.; Dai, J.; Pastel, G.; Jia, C.; Chen, C.; Hitz, E.; Siddhartha, D.; Yang, R.; Hu, L. Scalable and Highly Efficient Mesoporous Wood-Based Solar Steam Generation Device: Localized Heat, Rapid Water Transport. Adv. Funct. Mater. 2018, 28, 1707134.

Adv. Mater. 32 (2020) 1907932; M. Peydayesh; M. Suter, S. Bolisetty, S. Boulos; S. Handschin; L. Nystrom; R. Mezzenga; Amyloid Fibrils Aerogel For Sustainable Removal Organic Contaminants from Water.

\* cited by examiner

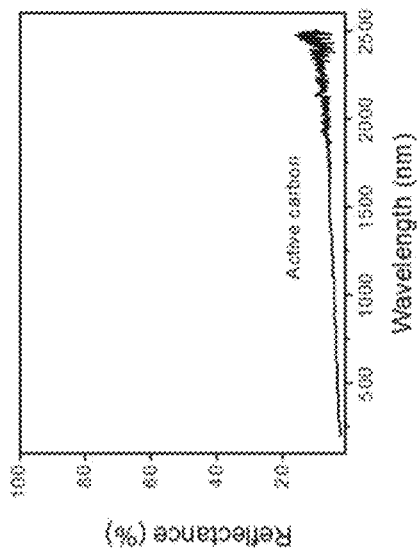
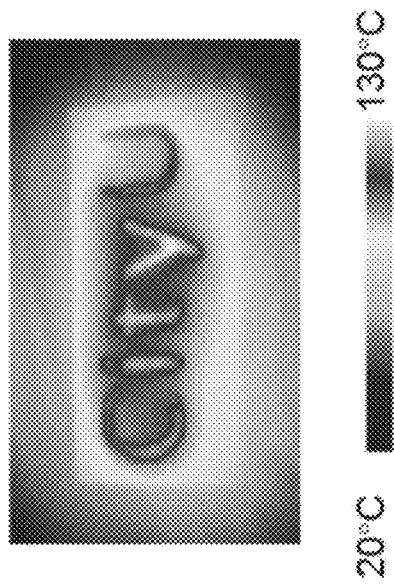
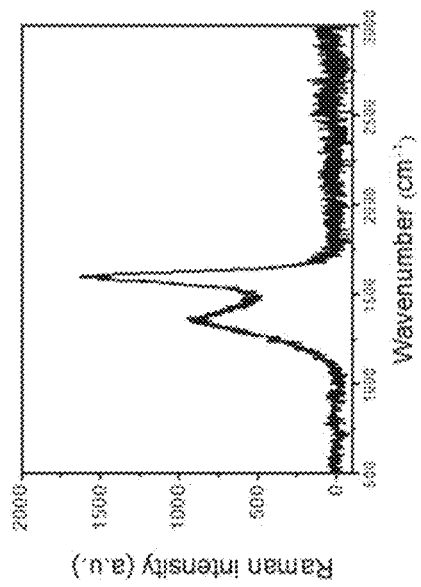
Figure 2A
Figure 2B
Figure 2C
Figure 2D

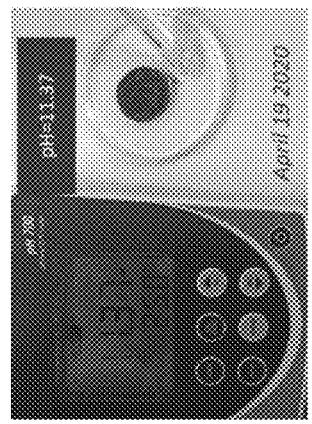
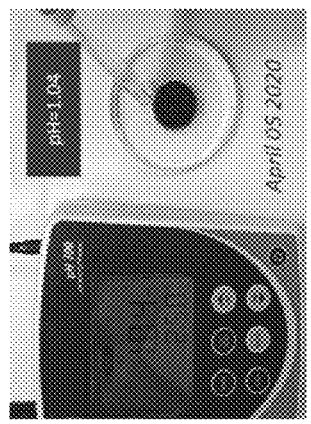
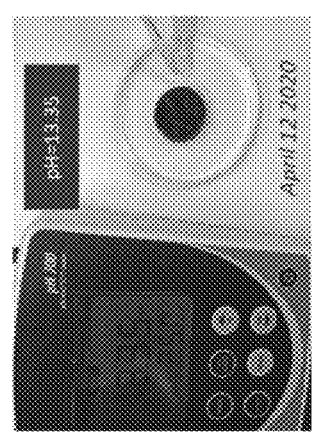
Figure 9A
Figure 9B

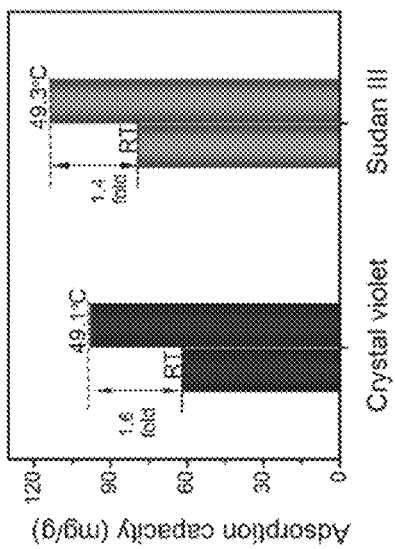
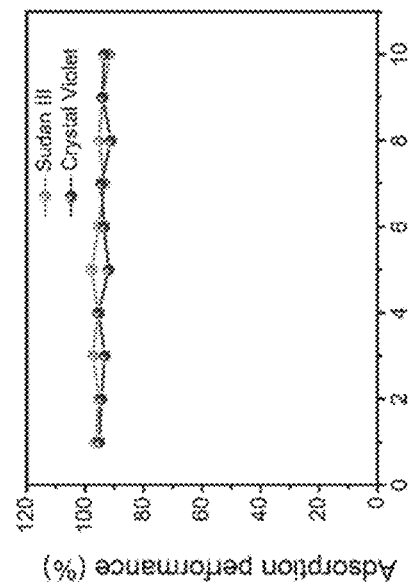
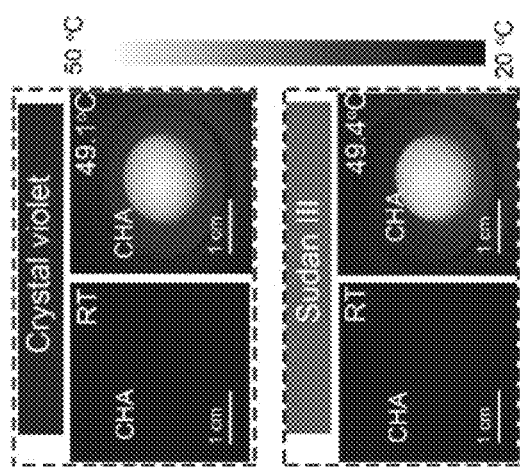
Figure 18A
Figure 18B
Figure 18C

COMPOSITE MATERIAL AND A WATER PURIFYING SYSTEM

FIELD OF THE INVENTION

The present invention pertains to a composite material, particularly a composite material that can separate purified water from a contaminated water source comprising a low-boiling-point contaminant.

BACKGROUND

Water plays a crucial role in human survival and civilization development. For example, approximately 70% of the freshwater used by humans goes to agriculture. Fishing in salt and fresh water bodies is a major source of food for many parts of the world. Much of the long-distance trade of commodities (such as oil, natural gas, and manufactured products) is transported by boats through seas, rivers, lakes, and canals. Large quantities of water, ice, and steam are used for cooling and heating, in industry and homes. Water is also an excellent solvent for a wide variety of substances both mineral and organic. Water, ice and snow are also central to many sports and entertainment, such as swimming, pleasure boating, boat racing, surfing, sport fishing, diving, ice skating and skiing.

Although water covers approximately 70.9% of the Earth's surface, the lack of clean water is still one of the major social concerns in the world, particularly in areas that lack regular raining most of the time or that lack water purification facilities. In particular, according to a 2007 World Health Organization (WHO) report, 1.1 billion people lack access to safe drinking water supply; 88% of the 4 billion annual cases of diarrheal disease are attributed to unsafe water and inadequate sanitation and hygiene, while 1.8 million people die from diarrheal disease each year. WHO estimates that 94% of these diarrhea cases are preventable through modifications to the environment, including access to safe water. Simple techniques for treating water at home, such as chlorination, filters, and solar disinfection, and for storing it in safe containers could save a huge number of lives each year. Reducing deaths from waterborne diseases is a major public health goal in developing countries.

However, current water purification and sterilization techniques generally suffer from the tedious instrumentation setup and the high costs. In view of these problems, renewable-energy-powered water purification system, particularly solar powered water purification systems, extensively develop in the past few years. In a typical solar powered water purification system, a solar absorber converts optical energy and radiation into heat for nearby water evaporation, in which the evaporated water (i.e. water vapor) will be condensed and collected, and therefore obtaining purified water. Thus, the solar powered water purification system may also be referred as solar steam generation system. In general, materials with a high photothermal conversion efficiency (PCE) are used for constructing high-performance solar steam generation system. For example, by using such kind of materials, the surface temperatures of the system may rise to over 60° C. under 1 sun illumination, and therefore a high water evaporation rate may be readily-achieved. However, at the same time, it would cause organic contaminants, particularly low-boiling-point contaminants, to be at least partially evaporated with the water, leading to a compromised purification performance.

Accordingly, there remains a strong need for improved water purifiers and methods for purifying water.

SUMMARY OF THE INVENTION

An aspect of the present invention relates to a composite material for floating on a contaminated water source, particularly a contaminated water source containing a low-boiling point contaminant. The composite material includes: A) a polymeric structure including a network of interconnected porous channels; and B) a carbonous material dispersed within the polymeric structure and the carbonous material has a functionalized surface. The polymeric structure draws contaminated water from the contaminated water source into the polymeric structure via capillary action, and the functionalized surface removes the low-boiling-point contaminant from the contaminated water.

In another aspect the present invention provides a method for purifying water including the steps of: A) drawing, via capillary action, contaminated water from a contaminated water source into the composite material according to an aspect of the present invention. The contaminated water source includes a low-boiling-point contaminant; B) applying radiation to the composite material to generate water vapor therefrom; C) condensing the water vapor into water droplets; and D) collecting the water droplets to form purified water.

Further provided in the present invention is a kit for harvesting purified water. The kit includes: A) a composite material according to an aspect of the present invention; B) a contaminated water unit; and C) a purified water collecting unit.

Without intending to be limited by theory, the inventors have, through their own researches, trials, and experiments, devised a composite material that can overcome or at least to mitigate the problem as mentioned above. In particular, the composite material may possess several advantages such as a high evaporation rate of 2.1 kg m$^{-2}$ h$^{-1}$ with 93% solar evaporation efficiency under 1 sun irradiation. The composite material may be capable of removing various contaminants including heavy metals, organic dyes, low-boiling-point contaminants and the like, while maintaining a high evaporation rate for water.

BRIEF DESCRIPTION OF THE DRAWINGS

FIG. 2A shows a Raman spectrum of active carbon of FIG. 1A;

FIG. 2B shows a Reflectance spectrum of active carbon of FIG. 1A;

FIG. 2C shows the temperature profiles of active carbon of FIG. 1A under various irradiation power;

FIG. 2D shows an Infrared (IR) image of active carbon of FIG. 1A confined into a CityU logo grooves;

FIG. 9A shows the appearance of CHA being put into an acidic solution of pH≈1.04 for 7 days;

FIG. 9B shows the appearance of CHA of FIG. 9A being put into an alkaline solution of pH≈13.35 for further 7 days;

FIG. 18A shows IR images of CHA upon adsorbing crystal violet (upper) and Sudan III (lower) in the dark and under Xe lamp irradiation;

FIG. 18B shows adsorption capacity of CHA toward crystal violet and Sudan III in dark conditions, room temperature of about 22° C., and upon Xe lamp irradiation;

FIG. 18C shows change in adsorption performance of CHA toward crystal violet and Sudan III at different regeneration cycles;

DESCRIPTION OF THE PREFERRED EMBODIMENTS

Figure 1B:
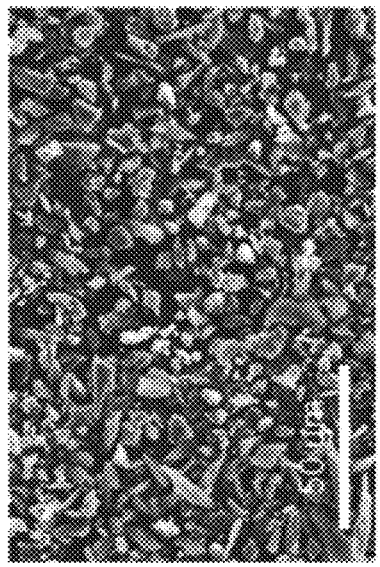
FIG. 1B shows a scanning electron microscope (SEM) image of FIG. 1A, with a scale bar of 50 μm.
Figure 1C:
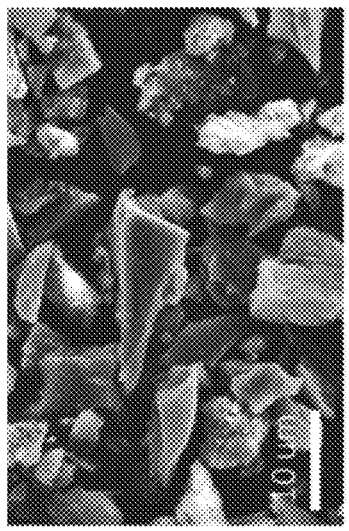
FIG. 1C shows a SEM image of FIG. 1a, with a scale bar of 10 μm.
Figure 1A:
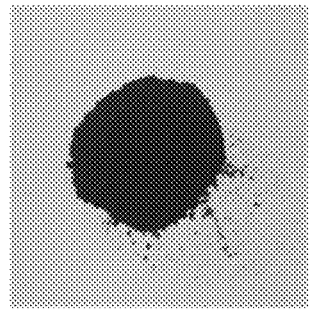
FIG. 1A shows the appearance of active carbon powder of an embodiment of the present invention.

Unless otherwise specifically provided, all tests herein are conducted at standard conditions which include a room and testing temperature of 25° C., sea level (1 atm.) pressure, pH 7, and all measurements are made in metric units. Furthermore, all percentages, ratios, etc. herein are by weight, unless specifically indicated otherwise. It is understood that unless otherwise specifically noted, the materials compounds, chemicals, etc. described herein are typically commodity items and/or industry-standard items available from a variety of suppliers worldwide.

As used herein, the forms "a", "an", and "the" are intended to include the singular and plural forms unless the context clearly indicates otherwise.

The term "purified water" generally describes water that has been subjected to a purification process, and by which one or more of undesirable chemicals, biological contaminants, suspended solids, and gases is removed from said water body. The purified water separated by the composite material of the present invention may meet some or most of the requirements of an international standard for a particular type of water quality. For example, in an embodiment, the purified water may at least having a resistivity that meets an international standard for a particular type of water quality. In particular, the purified water as described herein may have a resistivity that meets the requirements for Type IV, Type III, or Type II water as defined by the American Society for Testing and Materials (ASTM) D1191-91. Preferably, the purified water may have a resistivity that meets the requirements for Type III or Type II water as defined by ASTM. More preferably, the purified water may have a resistivity that substantially meets the requirements for Type II water as defined by ASTM, i.e. at least 1 MΩ·cm. The term "purification process" generally means a chemical process, a physical process and/or a biological process that can trap, hold, neutralize, reduce, and/or eliminate one or more of contaminants from the contaminated water.

The term "contaminated water source" generally means a water body into which a contaminant is introduced, and it is introduced in such a manner that reduces the ability of the body of water to provide its intended functions (e.g. as drinkable water, for medical, pharmacological, chemical, and industrial applications, etc.) that it would otherwise provide. The water body as described herein may include lakes, rivers, oceans, aquifers, reservoirs, groundwater, and domestic water. The term "contaminant" generally means a single constituent or a mixture of constituents that spoils, corrupts, infects, makes unfit, or makes inferior a material or a physical body. The term "contaminant" as used herein may comprise organic and inorganic compounds, particularly comprising organic dyes, metal ions, low-boiling-point contaminants and the combination thereof.

The term "low-boiling-point contaminant" generally means any chemical substances that can be evaporated along with water under standard atmospheric pressure of about 101.3 kPa. In particular, the low-boiling-point contaminant as described herein may be organic compounds having an initial boiling point less than or equal to about 250° C. (about 482° F.) measured at a standard atmospheric pressure of about 101.3 kPa. Alternatively, the low-boiling-point contaminant as described herein may further refer to mercury ion ($Hg^{2+}$) that can be evaporated along with water under standard atmospheric pressure of about 101.3 kPa, particularly the mercury ion from mercury dichloride ($HgCl_2$).

In the first aspect of the present invention, there is provided a composite material that is capable of separating purified water from a contaminated water source containing a low-boiling-point contaminant. The composite material may have a density of less than 1 $g/cm^3$ such that it can float on the contaminated water source surface to perform water purification. The composite material includes a polymeric structure and a carbonous material dispersed within the polymeric structure. The polymeric structure includes a network of interconnected porous channels that allows the polymeric structure to draw contaminated water from the contaminated water source into the polymeric structure via capillary action whereas the carbonous material includes a functionalized surface that can remove the contaminant from the contaminated water being drawn into the polymeric structure.

In an embodiment herein the composite material has a density of less than 1 $g/cm^3$; or from about 0.01 $g/cm^3$ to about 1 $g/cm^3$; or from about 0.05 $g/cm^3$ to about 0.99 $g/cm^3$; or from about from about 0.07 $g/cm^3$ to about 0.98 g/cm³; or from about from about 0.1 g/cm³ to about 0.9 g/cm³. Preferably, the composite material may have a density of about 0.79 g/cm³.

The network of interconnected porous channels may include a first network of porous channels and a second network of porous channels. In particular, the first network of porous channels may be infiltrated with the second porous channels, i.e. the porous channels of the first network may be interconnected with one another via the porous channels of the second network. The first network of porous channels may include pores with a pore size at least about 20 times larger than the pores of the second network of porous channel. In particular, the first network of porous channels may include pores with pore size between about 20 to about 60 times larger than the pores of the second network of porous channel. Preferably, the first network of porous channels may include pores with pore size between about 20 to about 100 times larger than the pores of the second network of porous channel. For example, the first network of porous channels may include pores with pore size from about 30 μm to about 150 μm, from about 50 μm to about 150 μm, from about 80 μm to about 150 μm, or particularly about 100 μm; whereas the second network of porous channels may comprise pores with pore size from about 0.1 μm to about 7.5 μm, from about 0.5 μm to about 6 μm, from about 0.7 μm to about 5.5 μm, or in particular from about 1 μm to about 5 μm.

The functionalized surface of the carbonous material generally means that a surface that is intrinsically incorporated with or is artificially incorporated with functional groups for serving a specific purpose. As referred herein, the functionalized surface may describe a surface that is intrinsically incorporated with or is artificially incorporated with functional groups that are able to form a physical bond, such as a hydrogen bonding with the contaminant, such that the contaminant is adsorbed to the functionalized surface. In particular, the functionalized surface may include a functional group selected from the group consisting of a hydroxyl group, a carboxyl group, a carbonyl group, an amino group, and a combination thereof, or a carboxyl group.

The composite material may has a porosity greater than about 70%. In particular, the composite material has a porosity from about 70% to about 85%, from about 77% to about 85%, or from about 77% to about 80%. Preferably, the composite material has a porosity of about 77%. The composite material may further has a specific surface area greater than about 5 $m^2g^{-1}$. In particular, the composite material may have a specific surface area from about 1.0 $m^2g^{-1}$ to about 20 $m^2g^{-1}$, from about 1.0 $m^2g^{-1}$ to about 15 $m^2g^{-1}$, from about 1.0 $m^2g^{-1}$ to about 12 $m^2g^{-1}$, from about 1.0 $m^2g^{-1}$ to about 10 $m^2g^{-1}$, from about 1.5 $m^2g^{-1}$ to about 10 $m^2g^{-1}$, from about 2.0 $m^2g^{-1}$ to about 10 $m^2g^{-1}$, from about 3.0 $m^2g^{-1}$ to about 8.0 $m^2g^{-1}$, from about 4.0 $m^2g^{-1}$ to about 7.0 $m^2g^{-1}$, or from about 5.0 $m^2g^{-1}$ to about 6.5 $m^2g^{-1}$. Preferably, the composite material has a specific surface area of about 6.33 $m^2g^{-1}$.

It is appreciated that porosity, specific surface area, and the pore size are some of the core factors that govern the permeability of a material toward a particular liquid. The composite material of the present invention with the aforementioned porosity, specific surface area, and a wide range of pore size distribution may be advantageous in facilitating the capillary action, ensuring a continuous supply of water into the composite material for water purification. As such, by simply deploying the composite material to the surface of the contaminated water source or by immersing a portion of the composite material into the contaminated water source, the contaminated water can be readily drawn into the composite material for purification. In one example embodiment, the composite material may be placed into an organic dye solution to perform purification. The composite material may draw the organic dye solution into its polymeric structure via capillary action and the organic dye may then be captured and trapped by the carbonous material upon being transported along the porous channels of the polymeric structure, and therefore purified water is separated from the organic dye. Any purified water retained in the composite material may be retrieved by squeezing the composite material. In another example embodiment, the composite material may be deployed on the surface of an immiscible organic dye solution-water mixture, in particular the organic dye solution floats on the water surface. The composite material may substantially draw the organic dye solution into its polymeric structure via capillary action, capture and trap the organic dye solution by the carbonous material, leaving the purified water behind.

In a particular embodiment, the composite material may be an aerogel. In an embodiment herein, the composite material may be a carbon-based aerogel. In an embodiment herein, the composite material may be an aerogel consists essentially of polyvinyl alcohol and active carbon.

The carbonous material may be selected from the group consisting of active carbon, amorphous carbon, carbonized biomass, carbonized wood material, and a combination thereof. In particular, the carbonous material may be selected from active carbon, amorphous carbon, or carbonized biomass. Preferably, the carbonous material is selected from active carbon.

The composite material may include at least 0.1 wt % of the carbonous material. In particular, the composite material may include from about 0.1 wt % to about 5 wt %, from about 0.5 wt % to about 5 wt %, or from about 1 wt % to about 5 wt % of the carbonous material. Preferably, the composite material may include about 5 wt % of the carbonous material.

In a particular embodiment, the polymeric structure further includes an evaporation region which is adapted to evaporate the purified water within the polymeric structure. The evaporation region may be formed when the composite material is exposed to radiation. For example, when radiation is applied substantially right on the top of the composite material or applied to the top of the composite material at an angle less than about 45° with respect to the vertical axis of the composite material, the carbonous material may absorb and convert the radiation into heat, which in turn heating up the polymeric structure, Owing to the direction of radiation applied to the composite material, the temperature at the top of the composite material would be developed more easily as compared with the bottom. As such it would develop a temperature gradient along the depth of the network of porous channels. That being said, there would be a gradual decrease of temperature from the top of the porous channels down to the bottom thereof. The depth of the network of porous channels may be about 0.2 cm to about 2 cm, about 0.2 cm to about 1 cm, about 0.2 cm to 0.8 cm, or particularly 0.5 cm. Such a temperature gradient would suggest that most of the heat absorbed by the carbonous material is localized at the top region of the polymeric structure, i.e. the evaporation region. Advantageously, on the one hand, it would ensure water within the polymeric structure to be evaporated readily, which in turn allowing contaminated water to be drawn into the composite material continuously; on the other hand, it may ensure the contaminated water within the composite material less likely to convert into water vapor prior reaching the evaporation region, such that providing sufficient time for the carbonous material to adsorb the contaminants, thereby enhancing contaminant removal efficiency of the composite material. In a n embodiment herein, the highest temperature of the temperature gradient may be at least 50° C.

The radiation applied to the composite material may be solar radiation. The solar radiation may be generated by natural sun irradiation, artificial solar radiation, and a combination thereof. In one example, the solar radiation may be artificially generated by the solar simulator and such stimulated solar radiation may have an intensity from about 1 sun irradiation unit to about 5 sun irradiation units.

The polymeric structure may include a hydrophilic polymer, particularly a hydrophilic polymer having a hydrophilic-lipophilic scale of at least 10 or from about 10 to about 18 on the HLB scale. In particular, the hydrophilic polymer may be selected from the group consisting of polyvinyl alcohol, poly(acrylamide), poly(ethylene glycol), poly-N-vinylpyrrolidone, polyurethanes, polyacrylic acid, polyethylene oxide, a co-polymer thereof, and a combination thereof. Preferably, the hydrophilic polymer may be selected from from the group consisting of polyvinyl alcohol, poly(acrylamide), poly(ethylene glycol), a co-polymer thereof, and a combination thereof. More preferably, the hydrophilic polymer is polyvinyl alcohol. Alternatively, the polymeric structure may include a polymer of polydimethylsiloxane, polyvinylidene fluoride and a combination thereof.

In the second aspect of the present invention, there is provided with a method for purifying water using the composite material as described above. The method includes the following steps:

A) drawing, via capillary action, contaminated water from a contaminated water source into the composite material as described herein, the contaminated water source includes a low-boiling-point contaminant;

B) applying radiation to the composite material to generate water vapor therefrom;

C) condensing the water vapor into water droplets; and

D) collecting the water droplets to form purified water.

In step A), the composite material is deployed on the surface, typically floated, of the contaminated water source such that the contaminated water can be drawn into the composite material via capillary action as a result of the network of interconnected porous channels as described above. In one embodiment, the composite material may be deployed directly on the surface of the contaminated water source. In another embodiment, the composite material may be deployed to a container containing a portion of contaminated water obtained from the contaminated water source. For example, the composite material may be deployed to a plastic container which contains a portion of contaminated water collected from the contaminated water source. Alternatively, the composite material may be deployed to a plastic container connected with a reservoir which supplies contaminated water to the container. In particular, step A) further includes the step of capturing and/or neutralizing; or capturing, the low-boiling-point contaminant by the carbonous material. As mentioned above, the carbonous material includes a functionalized surface that may form, for example, hydrogen or other type of permanent or temporary bond with the contaminant. Thus, as the contaminated water travels along the network of porous channels of the composite material, the contaminant may be adsorbed, and removed by the carbonous material. In an alternative embodiment, the carbonous material may chemically neutralize (i.e. render the contaminant inactive, or convert it to a harmless material) the low-boiling-point contaminant.

The low-boiling-point contaminant may include mercury ion, an organic solvent, an organic pesticide, and a combination thereof. In a particular embodiment, is the low-boiling-point contaminant may be an organic solvent, and it may be selected from the group consisting of ketone with C3-C5, alcohol with C2-C4, and a combination thereof. Preferably, the organic solvent is selected from the group consisting of acetone, ethanol, isopropanol, propanol, tert-butyl alcohol, and a combination thereof. In a further particular embodiment, the low-boiling-point contaminant may be an organic pesticide selected from the group consisting of omethoate, dimethoate, malathion, and a combination thereof. In an embodiment herein, the low-boiling-point contaminant may further refer to mercury ion ($Hg^{2+}$) that can be evaporated along with water under standard atmospheric pressure of 101.3 kPa, preferably, the mercury ion may be from mercury dichloride.

In another example embodiment, the contaminated water source may include an organic dye, such as used in the textile industry, or metal ions other than mercury ion. In particular, the organic dye may be selected from the group of Methylene blue (MB), Rhodamine B (RhB), Crystal violet, benzidine, Sudan III, and a combination thereof. The organic dye may have a concentration from about 0.001 mg/L to about 100 mg/L. The metal ions other than mercury ion particularly include $Fe^{3+}$, $Cu^{2+}$, $Cd^{2+}$, $Pb^{2+}$, $Zn^{2+}$, $Ni^{2+}$, $Al^{3+}$, $Se^{2+}$, $Mn^{2+}$, $Sn^{3+}$, $V^{5+}$, $Li^+$, $Na^+$, $K^+$, $Mg^{2+}$, and $Ca^{2+}$. The contaminated water source may have a metal ion concentration of from about 0.001 mg/L to about 1000 mg/L. In another example, the contaminated water source may include an acidic solution, and the acidic solution may cause the contaminated water source to have a pH of about 4 or below, from about 1 to about 3, from about 1 to about 2, or particularly below 2. In another example embodiment, the contaminated water source may include an alkaline solution, and the alkaline solution may cause the contaminated water source to have a pH of about 10 or above, from about 10 to about 13, from about 11 to about 13, or particularly above 11.

In step B), the radiation may be applied to the composite material by illuminating the composite material with a radiation from a particular direction. In particular, the radiation illuminates the composite material from a position substantially directly above the composite material or a position at an angle less than about 450 with respect to an axis vertically-perpendicular to the surface of the contamination water source. As mentioned above, the radiation applied to the composite material may be solar radiation. The solar radiation may be generated from a source selected from the group consisting of natural sun irradiation, a solar simulator, and a combination thereof. In particular, when the solar radiation is generated by the solar simulator, the intensity of such stimulated solar radiation may be of about 1 sun irradiation unit to about 5 sun irradiation units. In a preferred embodiment, the solar radiation generated by the solar simulator is of about 1 sun irradiation unit. The radiation may be applied to the composite material as long as the amount of purified water vapor generated meets the skilled person's requirements. For example, the radiation may be applied to the composite material for about 25 minutes, about 30 minutes, about 45 minutes, about 1 hour, about 3 hours, about 5 hours, about 10 hours, about 1 day, about 3 days, about 7 days, etc. A person skilled in the art would recognize to reduce the application time for generating the substantially same amount of vapor when the radiation intensity increases.

In step C), the water vapor generated from step B) may be condensed by providing a medium that has a temperature lower than the water vapor; or at or below the water condensation point, such that when the water vapor contacts the medium, it turns into water droplets, which can be collected in subsequent step D). In one example, a condensation chamber may be used to cover the container for condensing water vapor generated from the composite material. The condensation chamber may be a three-dimensional space enclosed by a plurality of walls, plates, panels, and the like, to help condense the water vapor into water droplets. The condensation chamber is preferably at least partially transparent such that solar radiation can be transmitted through the condensation chamber to the composite material during operation. In particular, the condensation chamber may be configured in a shape of a square frustum, a triangular prism, a square pyramid, a rectangular prism, and a combination thereof. In an embodiment herein, the condensation chamber may be configured in a house-shape, i.e. the top of the condensation chamber is in the shape of a triangular prism (i.e. a roof-like structure) and the bottom of the condensation chamber is a shape of rectangular prism.

In step D), the water droplets (i.e. condensate) in step C) may be collected, for example, by grooves or troughs, within the condensation chamber. In one example, where the condensation chamber is configured in a house-shaped. The grooves or troughs may be configured in parallel to each other, and in parallel with the horizontal plane of the condensation chamber. In particular, the grooves or troughs may be further connected to a purified water collecting unit such as a plastic bottle or a tank via plastic or other piping. As such, purified water is obtained.

In a third aspect of the present invention, there is provided a kit, particularly a portable kit, for harvesting purified water includes A) the composite material as described herein; B) a contaminated water unit; and C) a purified water collecting unit. The contaminated water unit may be a container of any shape that can store or hold a particular volume of contaminated water collected from a contaminated water source, and allows the composite material to fit thereupon. The contaminated water unit may be made of any materials known in the art that are not dissolved by the contaminated water and do not absorb the contaminated water. In particular, the contaminated water unit may be made of flexible polymer such as but not limited to silicon, such that the contaminated water unit may be foldable for storage purposes.

The purified water collecting unit may be a container that receives, hold, and/or store any purified water obtained from the composite material of the present invention. The purified water collecting unit may be of any form that is known in the art, such as but not limited to a plastic/metallic bottle, a cup, and the like.

In one embodiment, the kit may be operated by collecting a portion of contaminated water with the contaminated water unit from a contaminated water source, following by deploying the composite material to the surface of the contaminated water or immersing the composite material into the contaminated water. The composite material may therefore draw the contaminated water into its polymeric structure for contaminant capturing by the carbonous material dispersed within the polymeric structure. The purified water separated by the composite material may then, for example, be collected with the purified water collecting unit by squeezing the composite material.

In another embodiment, the kit may further include a condensation chamber as described above, a plurality of plastic pipings, and a solar simulator. The condensation chamber preferably includes hinges or any other mechanical components known in the art so as to configure the condensation chamber to be foldable. In operation, the condensation chamber may cover the contaminated water unit, which contains a portion of contaminated water with the composite material being deployed thereon or immersed therein. The condensation chamber may also be connected to the purified water collecting unit via the plurality of plastic pipings. The kit may then put under natural sunlight or under the illumination of the solar simulator in case natural sunlight is not available, for water purification.

EXAMPLES

Materials and Reagents Used

Active carbon powder (1800 $m^2g^{-1}$) was obtained from Nanjing XFNANO Materials Tech Co., Ltd (Nanjing, China). Hydrochloric acid (HCl, 37 wt %) was purchased from Sigma-Aldrich. PVA (Mw=13 000-23 000) was obtained from Sigma-Aldrich. Methylene blue (MB) was brought from J&K chemical (Beijing, China), Rhodamine B (RhB) was purchased from Sigma-Aldrich. $HgCl_2$, $AgNO_3$, $Pb(NO_3)_2$, $Cd(NO_3)_2$, and $NiCl_2$ were obtained from Sinopram Chemical Reagent Co., Ltd. (Shanghai, China). Omethoate, dimethoate, and malathion were purchased from AccuStanard (New Haven, CT). Unless otherwise special declared, all chemicals were used as received. Deionized water (18.2 MΩ·cm) was used for all the following experiments.

Instrumentation and Methods Applied

Characterization

SEM images were recorded using scanning electron microscopy (SEM, Philps XL-30 FEG) at an accelerating voltage of 10 kV. Pore size (diameter of the pore) of the carbon-hybrid aerogel (CHA) was measured by comparison between a distance obtained from a two-point measurement with standard ruler in SEM. A solid absorption spectrum was measured by SolidSpec-3700/3700DUV (Shimadzu). The concentration of heavy metal ions in both pollution water and purified water was determined by inductively coupled plasma optical emission spectroscopy (ICP-OES), Optima 8000, PerkinElmer). The temperature distribution on the evaporation surface and along the thickness direction were captured by an infrared camera (Fluke Ti400). All the IR data were processed by SmartView 4.0, and the temperature change and mass change data were processed by Origin 8.5.

Preparation of CHA

Figure 37:
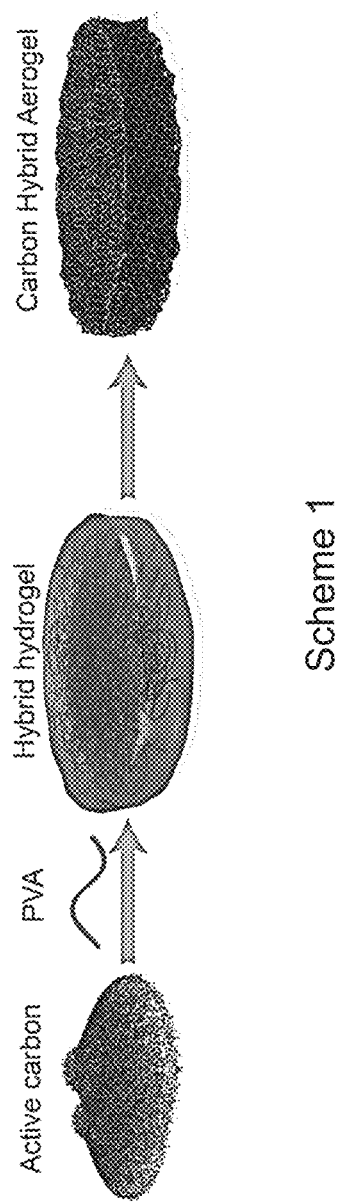
FIG. 37 shows a schematic diagram of preparation of carbon hybrid aerogel.

The process of fabricating an embodiment of the carbon-hybrid aerogel (CHA) is illustrated in Scheme 1 of FIG. 37. 0.05 g of active carbon was added into a 25 mL beaker containing 5 mL of PVA solution (10 wt %); then, 4.5 mL of deionized water was added into the mixture. After that, the mixture was stirred with a magnet for 10 min. Finally, 1.5 mL of hydrochloric acid (1.2 M) was added into the above-mentioned mixture for gelation. After the gelation was carried out for 2 h at room temperature, the hybrid gel was immersed into deionized water overnight to get the pure hybrid hydrogel. Then, the hybrid gel was placed in a −20° C. freezer to freeze the hybrid hydrogel, which was then thawed in a water bath at 37° C. The freeze-thaw process was repeated at least 10 times. After undergoing a freeze-drying process, the obtained network was placed into hydrazine aqueous solution at 65° C. for 8 h. Finally, the network was washed with deionized water three times to remove extra hydrazine.

Stability of CHA

The mechanical stability of the CHA was investigated by tearing the CHA into small pieces, followed by subjecting to sonication for at least 8 h at room temperature. The pH stability of the CHA was investigated by soaking a piece of CHA in an acidic solution with a pH value of 1.04 for 7 days. After that, the acid-treated CHA was transferred to and soaked in an alkaline solution with a pH value of 13.36 for another 7 days.

Adsorption Measurement

The adsorption tests were carried out in two different temperature models. One is contaminant adsorption at room temperature, another is adsorption under Xe lamp irradiation at 1 kW m$^{-2}$. Crystal violet and Sudan III were used as organic contaminants to evaluate the water purification performance of CHA. For crystal violet, first, an aqueous solution of crystal violet (concentration: 50 μM) was prepared in a plastic dish with a diameter of 60 mm. Then, a piece of CHA was carefully placed into the crystal violet solution. After the crystal violet solution was completely adsorbed into the CHA, the solution was squeezed out from the CHA for concentration measurements. For Sudan III, an aqueous solution of Sudan III was prepared by first dissolving Sudan III into cyclohexane with a concentration of 100 μM, followed by slowly pouring 0.4 mL of the Sudan III-cyclohexane solution into 6 mL of water. A piece of CHA was then placed on the Sudan III-cyclohexane water surface. After the Sudan III-cyclohexane solution was completely adsorbed by the CHA, the residual solution in the plastic dish was subjected to concentration measurements. The concentrations of the samples were analyzed by an Agilent Cary 8454 UV-vis spectrophotometer at fixed time intervals.

The experimental procedures for studying the influence of illumination on the adsorption capacity of CHA with respect to the referred two contaminants were generally the same as those studying at room temperature, except that the experiments were conducted under illumination of a Xe-lamp with a light intensity of 1 kW m$^{-2}$.

The apparent concentrations of crystal violet and Sudan III were measured and calculated by absorbance. The adsorption capacities of the adsorbent were calculated according to the following equation:

$$e = \frac{(C_0 - C_e)V}{m} \quad (1)$$

where $C_0$ and $C_e$ represent the initial and equilibrium concentrations of contaminants, respectively, V is the volume of the solution (6 mL), and m is the amount of the adsorbent.

Solar Driven Steam Generation

The prepared 3D hybrid network was molded with a diameter of 28 mm, and then, the network was floated on the surface of bulk water in a glass baker. A steam generation experiment was performed by using a solar light simulator, which was configured with an optical filter for a standard AM 1.5G spectrum. The networks were irradiated under a solar simulator (PLS-SXE300D/300DUV, Beijing Perfectlight, Bejing, China) at various light densities (1, 3, and 5 kW m$^{-2}$), and the mass change was calculated by measuring the weight of the evaporation system using an electronic mass balance every 5 min (Shimadzu, AUW22OD, 0.01 mg in accuracy) for 1 h under steady-state conditions. Meanwhile, the evaporation process of each network under different light density were recorded by an IR camera, respectively. The ambient temperature was 20° C., and the ambient humidity was 55%. The evaporation rate of pure water under dark conditions was subtracted from all the measured evaporation rates to eliminate the effect of natural water evaporation. The corresponding energy efficiency (η) for solar to steam generation could then be calculated using the following formula:

$$\eta = \frac{mh_v}{C_{opt}P_o} \quad (2)$$

where m is the solar steam generation rate, $h_v$ is the evaporation enthalpy of water, and $P_o$ is the power density of solar illumination. For pure water evaporation, the evaporation rate in dark condition was 0.012 kg m$^{-2}$ h$^{-1}$ and the pure water evaporation rate under 1 sun irradiation was 0.033 kg m$^{-2}$ h$^{-1}$. For blank PVA network, the evaporation rate was 0.031 kg m$^{-2}$ h$^{-1}$ without solar illumination; the evaporation rate under 1 sun (1 kW m$^{-2}$) was measured as 0.641 kg m$^{-2}$ h$^{-1}$ in this work. $h_v$ can be calculated using eq 3:

$$h_v = C\Delta T + \Delta h \quad (3)$$

where, C is the specific heat capacity of water, ΔT is the temperature increase of water, and Δh is the enthalpy of vaporization on the relative temperature.

Water Purification for Low-Boiling-Point Contaminants

Mercury contaminated water purification was conducted as follows: Mercury chloride solutions (15.56 mg/L, 50 mL) were treated as contaminated water. Apiece of CHA was placed on the bulk mercury chloride solutions under solar irradiation (1 kW m$^{-2}$); the steam was collected by a condensing system and the mercury concentration in the purified water was measured by ICP. As comparison, same experiments were conducted on a piece of plasmonic aerogel network.

Adsorption removal of mercury was carried out by dropping 1.5 mL of mercury solution on CHA; after 30 min, water was squeezed out from the CHA and subjected to mercury concentration measurements by ICP.

Three kinds of pesticides, namely, omethoate, dimethoate, and malathion were selected as the model for controlling the low-boiling-point contaminants that escaped in the evaporation process. The solar evaporation was conducted as mentioned above, and the concentrations of pesticides were determined by GC-FID.

Wastewater Purification

Contaminated water purification was conducted by collecting the condensed steam that was generated by the CHA upon solar illumination. A homemade all-in-one device was fabricated to simulate the industrial contaminated water purification process in reality. Three water-soluble dyes, methylene blue (MB, 50 mg L$^{-1}$) Rhodamine B (Rh B, 50 mg L$^{-1}$), and methylene orange (MO, 50 mg L$^{-1}$), were treated as simulated wastewater. The absorbance changes were recorded after solar purification. For heavy ions wastewater purification, 11 kinds of metal ions ($Fe^{3+}$, $Cu^{2+}$, $Cd^{2+}$, $Pb^{2+}$, $Zn^{2+}$, $Ni^{2+}$, $Al^{3+}$, $Se^{2+}$, $Mn^{2+}$, $Sn^3$, $V^{5+}$, and $Li^+$) were added to the as-simulated wastewater. The concentration of the metal ions in the purified water was determined by ICP-OES.

Outdoor Evaporation of CHA

Outdoor purification of dye-contaminated water was conducted by a lab-made device. A piece of CHA with a dimension of 20 cm×30 cm was floated on the contaminated water in an inset container of the outdoor device. The generated steam condensed on the roof of the device and was collected by the designed trough. The mass change and temperature of the device were measured every 60 min in the range 8:00-18:00. The corresponding solar irradiation intensity were record simultaneously.

Example 1A

Preparation and Structural Characterization of CHA

The carbon hybrid aerogel (CHA) was fabricated by an in situ gelation method of commercially available active carbon and PVA, followed by a freeze-drying process. The characterization of the active carbon, blank PVA (i.e., without active carbon), and CHA are illustrated in FIGS. 1A-1C, 2A-2D, and 3A-3C.

Figure 3A:
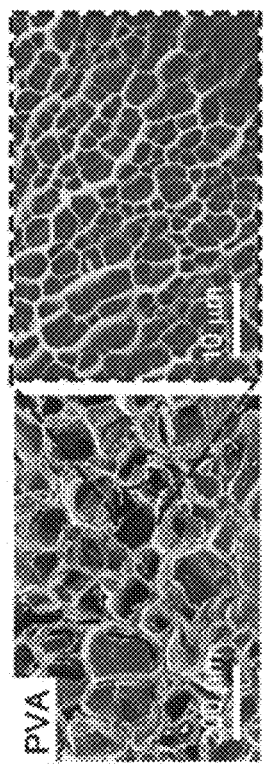
FIG. 3A shows an SEM image of blank PVA gel.
Figure 3B:
FIG. 3B shows an SEM image of a PVA gel loaded with 5 wt % active carbon.
Figure 3C:
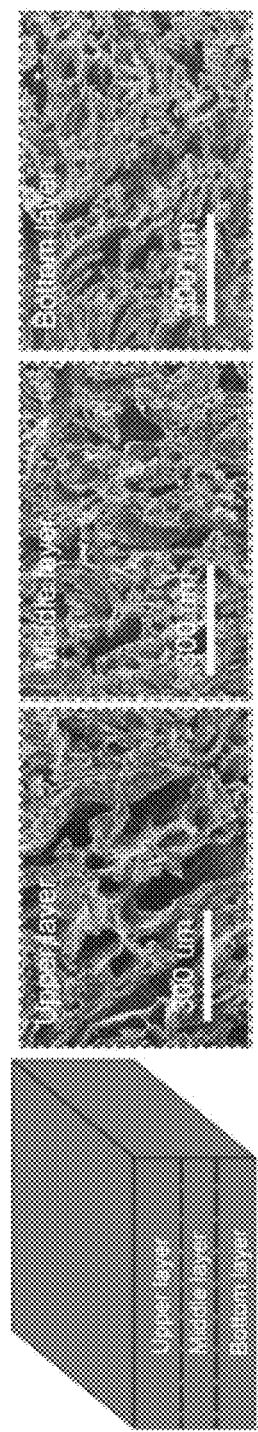
FIG. 3C shows a series of SEM images carbon hybrid aerogel (CHA) at different layers.

As illustrated in FIGS. 1A-1C and FIGS. 2A-2D, the active carbon particles have a general size of about 10 μm to about 20 μm, and is capable of acting as a solar absorber upon receiving solar radiation of different intensities. The internal morphology and microstructure of blank PVA and CHA were characterized with scanning electronic microscopy (SEM). The prepared blank PVA foam shows a porous architecture with a pore size around 100 μm (FIG. 3A, left). In addition, small pores with sizes ranging from 1 to 5 μm were distributed on the three-dimensional (3D) framework wall (FIG. 3A, right). As revealed by FIG. 3B, the active carbon particles were dispersed into the self-supporting PVA frameworks with uniform distribution. These results confirm that the PVA network serves as a scaffold to support the active carbon particles. Furthermore, the morphology of porous architecture across the upper, middle, and bottom layer of CHA is generally the same (FIG. 3C).

Figure 4:
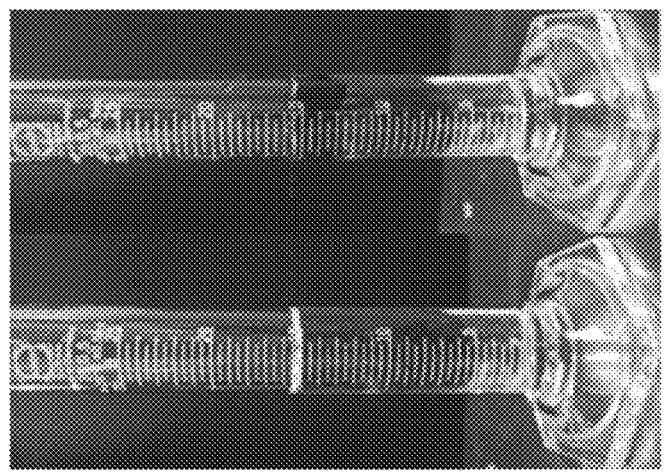
FIG. 4 shows the measurement of porosity of CHA by volume change after absorbing water.
Figure 5:
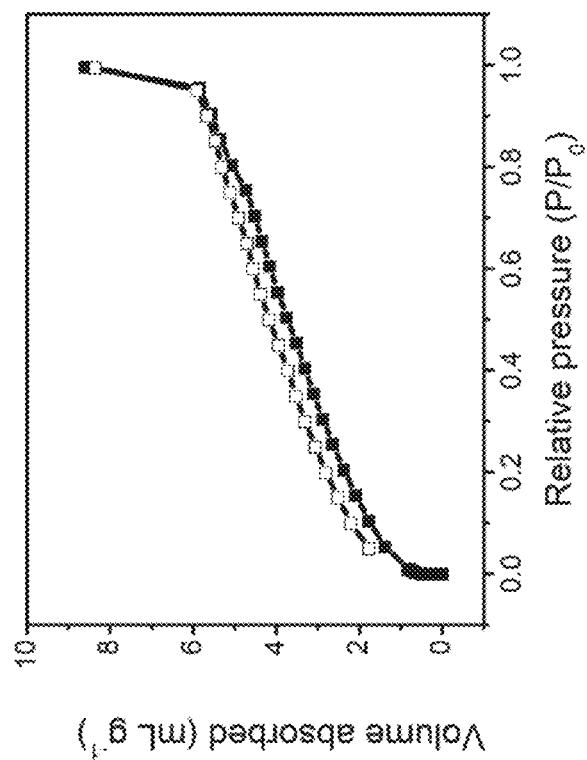
FIG. 5 shows the $N_2$ adsorption-desorption isotherms of CHA with 5 wt % active carbon.

The porosity and the surface area of the CHA were determined by measuring the volume change after absorbing water, and by using BET method, respectively. It was deduced that the porosity of CHA reaches up to 76.8% with a specific surface area of 6.33 $m^2$ $g^{-1}$ (FIGS. 4 and 5).

Example 1B

Wettability and Capillary Action of CHA

Figure 6A:
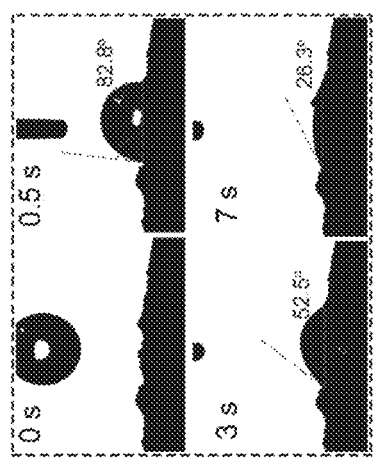
FIG. 6A shows the water contact angles of CHA at different timeframes.
Figure 6B:
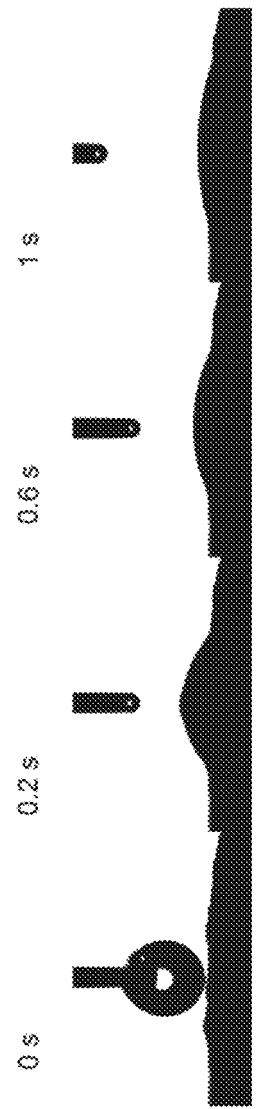
FIG. 6B shows the water contact angles of blank polyvinyl alcohol (PVA) network at different timeframes.
Figure 7:
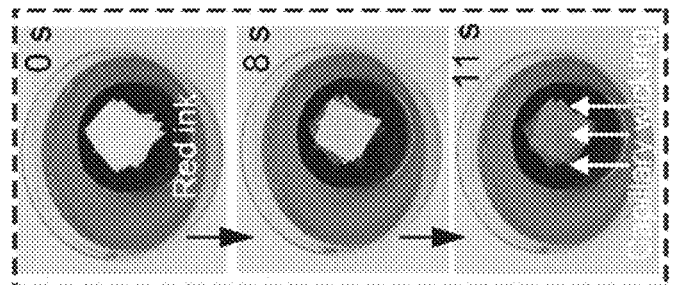
FIG. 7 shows the wettability of the CHA.

Wettability experiments indicate that the CHA shows an increasing hydrophobic trend compared with the blank PVA aerogel (FIGS. 6A and 6B), which is ascribed to the hydrophobic properties of active carbon. In order to illustrate the capillary wicking process, several pieces of tissue paper were placed on the CHA surface. Red-ink water was readily wicked and transported to the surface of CHA by capillary force upon floating the CHA on the water. The white tissue paper turned to red owing to soaking of the wicked red-ink water (FIG. 7). As a result, it can be confirmed that the CHA network has superior capillary action, ensuring a continuous replenishment of water supply to the evaporation regions (i.e. the top surface of CHA).

Example 1C

Stability of CHA

Figure 8:
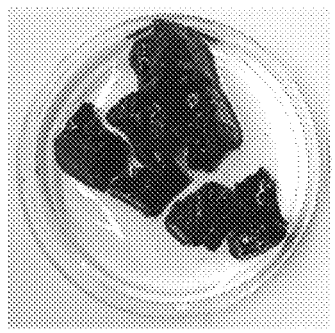
FIG. 8 shows the appearance of CHA being cut into pieces and soaked in water and subjected to overnight sonication.
Figure 8:
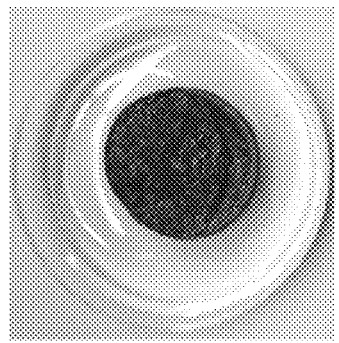
Figure 10:
FIG. 10 shows the appearance of CHA upon subjecting to flexibility test.

Additionally, the stability of CHA is crucial for practical applications. Thus, it is important to ensure that the active carbon particles are firmly adhered to the PVA network. To verify this, a piece of CHA network was torn into several fragments and then continuously ultrasonicated (power: ~120 W) in a water bath for 9 h at room temperature (FIG. 8). After ultrasonication, the water showed no observable change in color, confirming a negligible loss of active carbon from the PVA network. Moreover, to verify the long-term stability of CHA in harsh conditions, a piece of CHA was placed into an acidic solution (pH=1) for 7 days. Then, the same CHA was rinsed with water and then placed into an alkaline solution (pH=13) for another 7 days. As reveled in FIGS. 9A and 9B, there is no observable damage on the CHA. The CHA also possesses excellent elasticity. As illustrated in FIG. 10, the CHA network is capable of recovering to its original shape after releasing the pressure.

Example 1D

Photophysical and Photothermal Properties of CHA

Figure 11A:
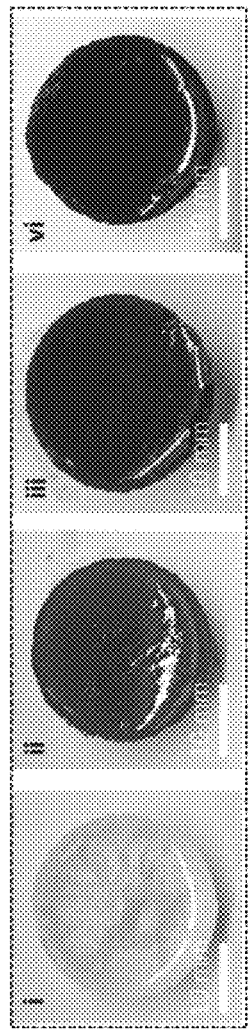
FIG. 11A shows images of PVA hydrogel loaded with different wt % of active carbon; i) 0 wt %; ii) 0.01 wt %; iii) 1 wt %; and iv) 5 wt %.
Figure 11B:
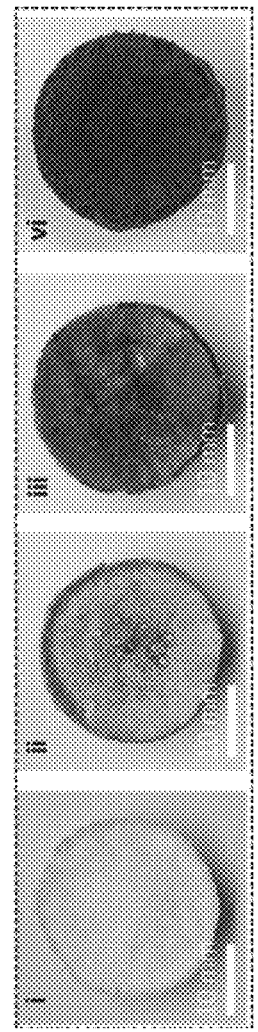
FIG. 11B shows images of the PVA hydrogels of FIG. 11A after freezing-drying.
Figure 12B:
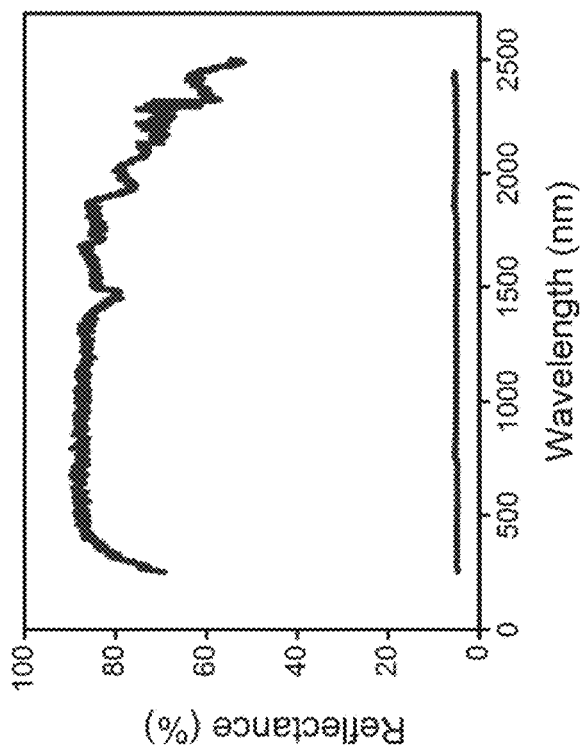
FIG. 12B shows reflectance spectra of carbon hybrid aerogel doped with 2.5 wt % active carbon powder (the upper curve) and blank PVA (the low curve)
Figure 12A:
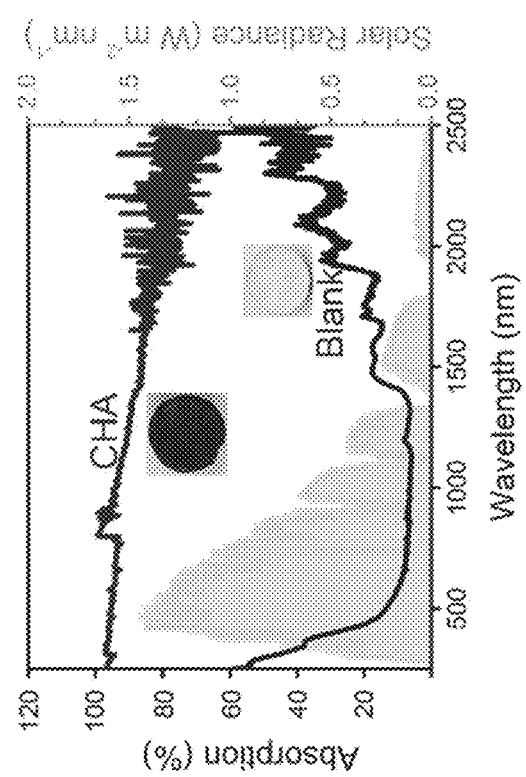
FIG. 12A shows absorption spectra of blank PVA and carbon hybrid aerogel.

After loading active carbon, the color of PVA foam changed from white to dark (FIGS. 11A and 11B). The reflection and absorption spectra of blank PVA foam, active carbon powder, and CHA were measured using a spectrophotometer. As shown in FIG. 12A, the blank PVA network shows negligible light absorption due to its high reflection intensity. Compared with blank PVA network, the CHA shows a much stronger light absorption from UV to IR with an averaged absorption of 98% (weighted by AM 1.5G solar spectrum). A reflection spectrum of the CHA network confirms that only less than 5% of light is reflected (FIG. 12B). These results imply that the CHA can effectively harvest solar energy over the full solar spectrum.

Figure 13B:
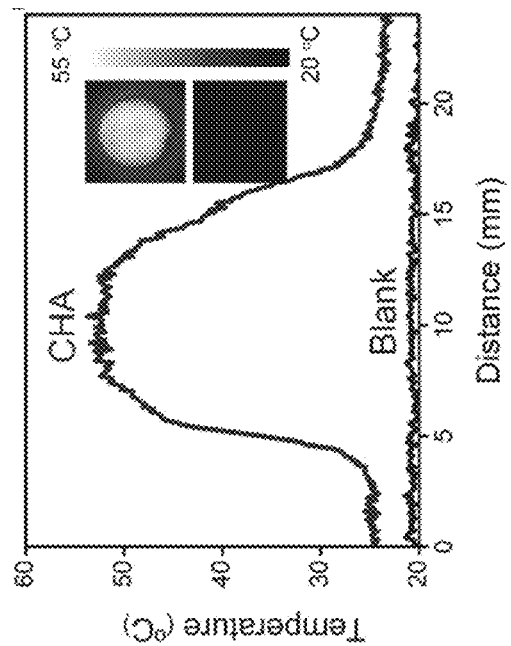
FIG. 13B shows temperature profiles of CHA surface under 1 sun irradiation.
Figure 13A:
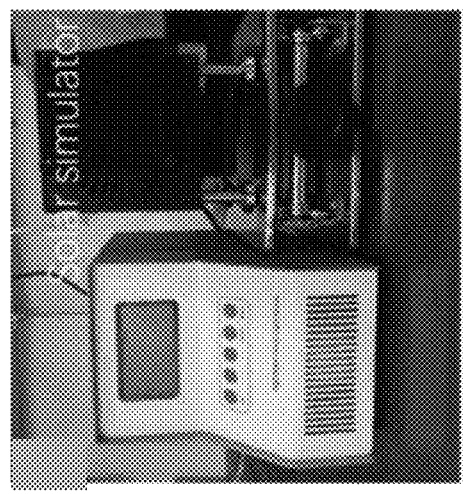
FIG. 13A shows an image of a solar simulator.
Figure 13C:
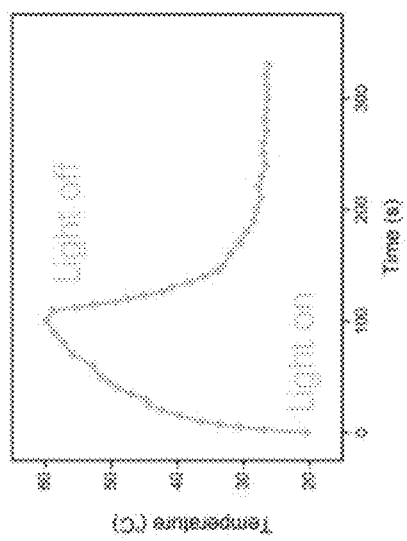
FIG. 13C shows surface temperature profiles of CHA upon light on and light off of the solar simulator of FIG. 13A.
Figure 13D:
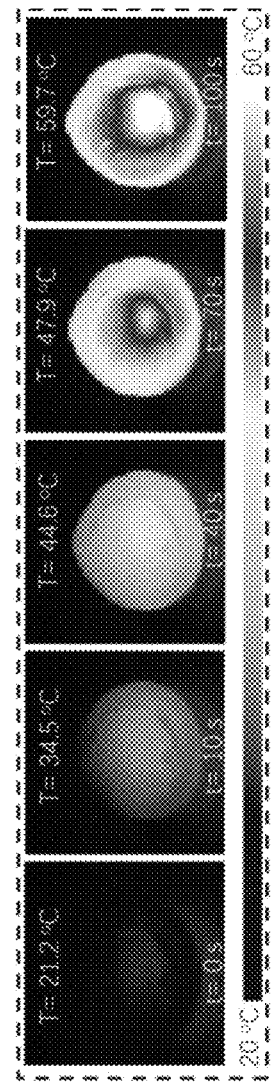
FIG. 13D shows IR images of CHA under illumination of solar simulator of FIG. 13A (solar irradiation density: 1 kW $m^{-2}$, AM 1.5 G).

The photothermal properties of CHA were investigated using the setup as illustrated in FIG. 13A. As revealed by FIGS. 13B-13D, it is manifest that a hot region was present on the surface of CHA and such region was rapidly established upon illumination with a solar simulator. In particular, the surface temperature of CHA quickly rose to 54.3° C. upon 1 sun irradiation, where in sharp contrast, the CHA without irradiation showed negligible temperature change (22.3° C.).

Figure 14:
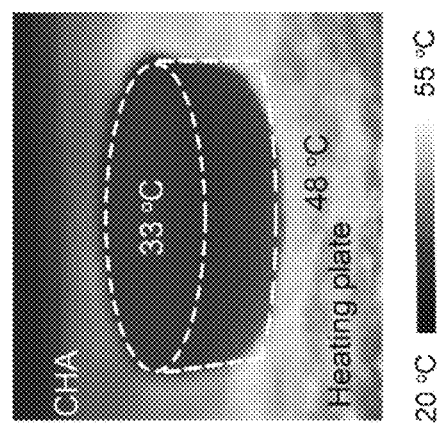
FIG. 14 shows an IR image of CHA after heating for 1 h on a 50° C. heating plate.

Next, the thermal insulation property of the porous framework was tested. The time-dependent thermal resistance property was evaluated by recording the thermal images of the network being put onto a heating plate at about 180° C. The surface temperature of the CHA sample reached a steady value of only 33° C. on a heating plate at 50° C. for 1 h, which demonstrates the good heat-insulating property of CHA (FIG. 14). The excellent thermal insulation property can be ascribed to the inner porous structure that endows CHA with a low thermal conductivity, which is important for building a high-performance photothermic evaporation system.

Example 1E

Purification of Wastewater Containing Organic Pollutants Using CHA

Two kinds of organics dyes, which are common contaminants in textile industry, are selected for demonstrating the ability of CHA on organic contaminants removal. In particular, the ability is demonstrated by way of removing crystal violet (water-soluble) dissolved in water and a cyclohexane solution of Sudan III (oil-soluble) floating on water. As illustrated in FIG. 15A, top row, crystal violet was swiftly adsorbed (<10 s) into the CHA after placing the CHA into the crystal violet solution (50 μM). The purified water can be further obtained by squeezing the CHA. The Sudan III-cyclohexane solution did not mix with the water but floated on the water as a separate layer. After placing the CHA onto the surface of polluted water, the CHA freely floats on the bulk water surface as a consequence of the low density of CHA. The CHA exhibited quick adsorption toward Sudan III-cyclohexane (<10 s) without shaking and rotation (FIG. 15A, bottom row).

Figure 15B:
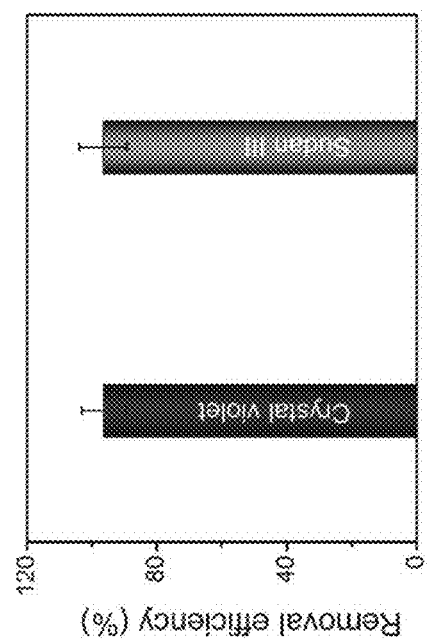
FIG. 15B shows removal efficiency of crystal violet and Sudan III by CHA.
Figure 15A:
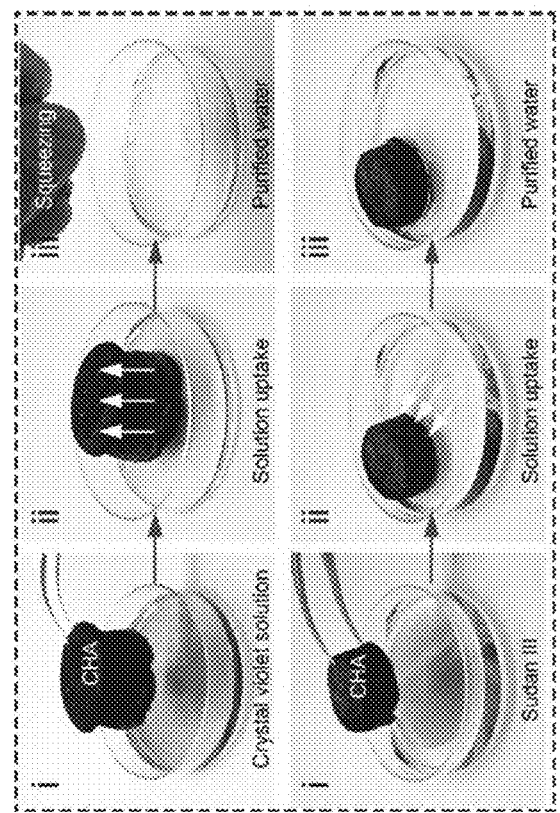
FIG. 15A shows images of organic dyes (upper: crystal violet; lower: Sudan III) removal by CHA.

As revealed by FIG. 15B, the adsorption capability of CHA for the two organic dyes were found to be: 96.4% for crystal violet and 94.7% for Sudan III. These results imply that CHA has a strong adsorption capacity for the organic dyes, and the results are comparable to other reported work (Table 1). Whilst the CHA of this work exhibited a comparable adsorption capacity as other reported work, the inventors noted that none of those reported work could adsorb low-boiling-point as this work does (which will be discussed in later part of this disclosure).

coordination between CHA and contaminants. This illumination-enhanced adsorption of CHA is much different from common carbon materials, endowing it with a wide range of temperature adaptation.

Other factors that influence the practical application of wastewater purification material are regeneration and ease of reuse. To demonstrate the reusability of CHA, the removal efficiency of Sudan III was measured after washing CHA with cyclohexane, whereas the removal efficiency of crystal violet was measured after washing CHA with a water/ethanol (1:1, v/v) mixture. As revealed by FIG. 18C, the regenerated CHA retained >90% of its original adsorption capacity after 10 adsorption-desorption cycles for both crystal violet and Sudan III, which further confirms the high adsorption capacity and good cycle stability of CHA.

TABLE 1

Comparison adsorption capacity of reported materials

| Material | Substance | Adsorption Efficiency (%) | Reference |
|---|---|---|---|
| Amyloid fibrils | Bentazone | 92 | Adv. Mater. 32 (2020) 1907932 |
| g-$C_3N_4$@$TiO_2$ | Soybean oil | 99.5 | Adv. Funct. Mater.28 (2018) 1706545 |
|  | Diesel | 88.7 |  |
| RGO/CNF aerogel | Ethanol | 78.0 | Small 13(2017) 1700453 |
| Graphdiyne | Dichloromethane | 98.0 | Adv. Mater. 28 (2016)168-173 |
| h-BN cellular networks | Hexane | 99.0 | ACS Nano 11(2017) 558-568 |
| RF-GO aerogel | Methylene Blue | 97.9 | Angew. Chem. Inte.r Ed. 54 (2015) 2397-2401 |
| CNF Hydrogels | Methylene Blue | 98.5 | Angew. Chem. Inte.r Ed. 51(2012) 5101-5105 |
| CHA | Crystal violet | 96.4 | This work |
|  | Sudan III | 94.7 |  |

Figures 16A, 16B:
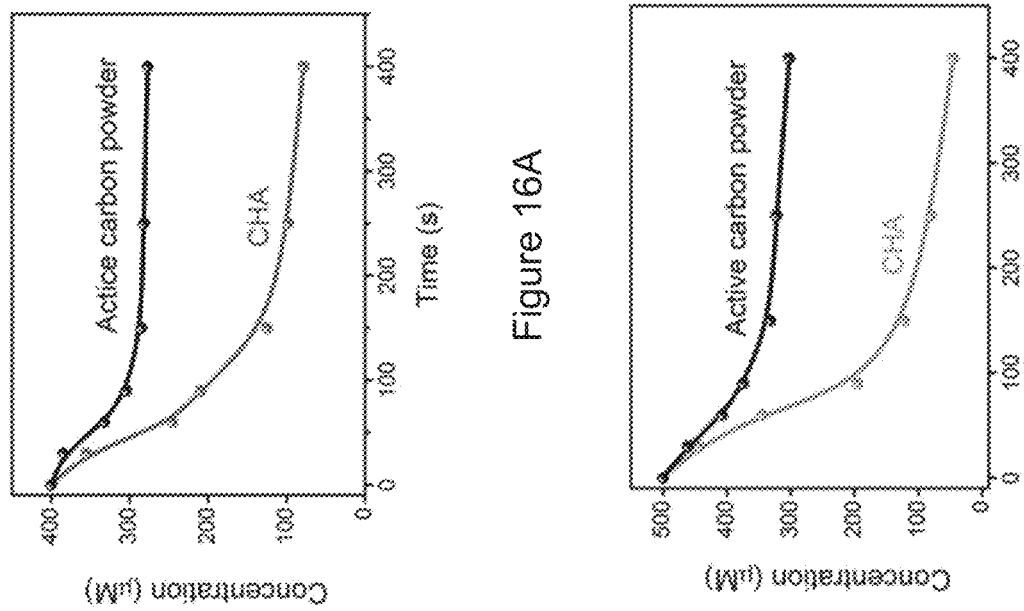
FIG. 16A shows adsorption kinetic plots and curve fitting by pseudo-first-order kinetic models of CHA adsorption for crystal violet at room temperature.
FIG. 16B shows adsorption kinetic plots and curve fitting by pseudo-first-order kinetic models of CHA adsorption for Sudan III at room temperature.
Figure 17A:
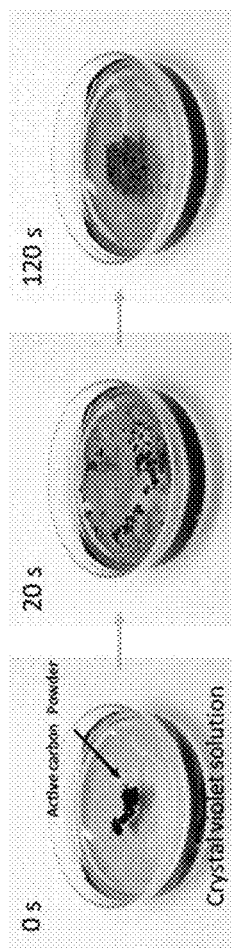
FIG. 17A shows images of adsorption performance of active carbon powder for crystal violet solution (50 μM)
Figure 17B:
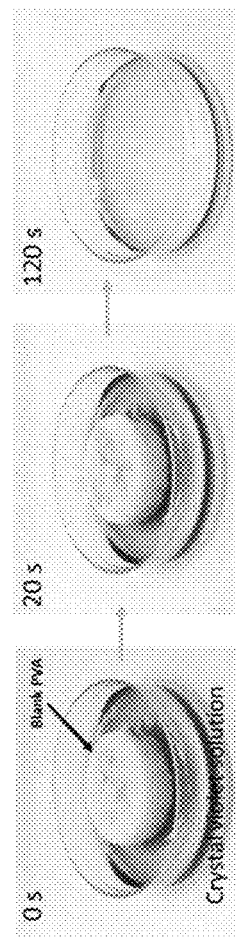
FIG. 17B shows images of adsorption performance of blank PVA for crystal violet solution (50 μM)

The adsorption kinetics of CHA with respect to the above two organic dyes were studied by measuring the concentrations of dye in the contaminated water samples. As revealed in FIGS. 16A and 16B, an adsorption equilibrium was reached at around 6 min for both contaminants. For comparison, same amount of active carbon powder was added into the water samples for dye adsorption. As illustrated in FIGS. 17A and 17B, the purple color of the contaminated water cannot be completely removed after 6 min even using the same amount of active carbon powder as the CHA, suggesting the CHA shows a much better adsorption performance compared to the native active carbon powder. Similarly, the blank PVA sample exhibits insufficient dye removal performance under the same experimental conditions (FIG. 17B). These results suggest that the excellent dye adsorption property of CHA is attributed to a synergetic effect of the active carbon and the PVA network.

Figure 19C:
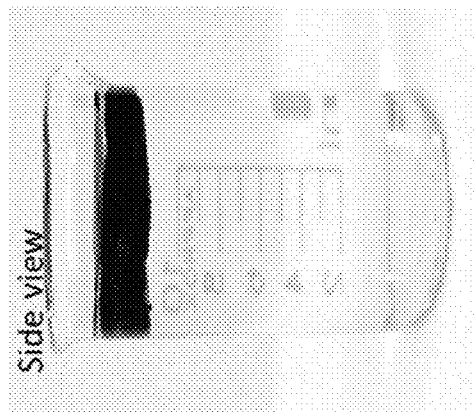
FIG. 19C shows a side view of CHA of FIG. 19B floating on bulk water in a beaker.
Figure 19B:
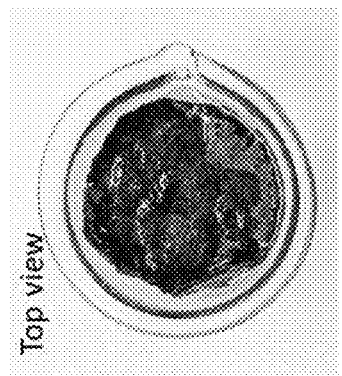
FIG. 19B shows a top view of CHA floating on bulk water in a beaker.
Figure 19A:
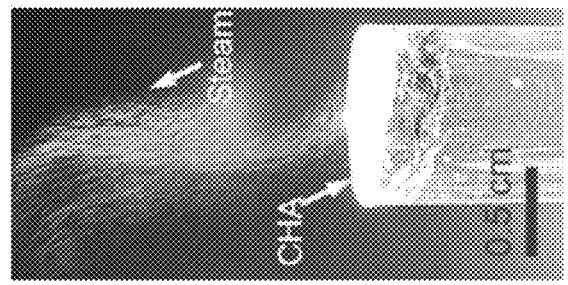
FIG. 19A shows an image of solar steaming process of CHA by solar simulator under 5 kW $m^{-2}$.

To demonstrate the temperature influences on the adsorption performance of CHA, the organic dye removal experiments were carried out at room temperature (dark condition) and under Xe lamp irradiation, respectively. The IR images of CHA at different irradiation conditions for the adsorption experiment indicate that, under 1 sun irradiation, the surface temperature of CHA increases up to about 50° C., accompanied by significant improvements in adsorption capacity for both crystal violet and Sudan III compared to that in dark conditions (FIGS. 18A and 18B). One possible reason is that a higher temperature improves the activity of functional groups in CHA, which can speed up the random thermal motion of contaminant molecules, thereby accelerating the Example 1F Solar-Driven Water Purification Using CHA Solar-driven water evaporation was first evaluated at laboratory conditions by freely floating a piece of CHA onto a glass beaker with certain volume of water. Under solar simulator irradiation at 5 sun, water steam can be clearly observed after 60 s (FIG. 19A).

Figure 20B:
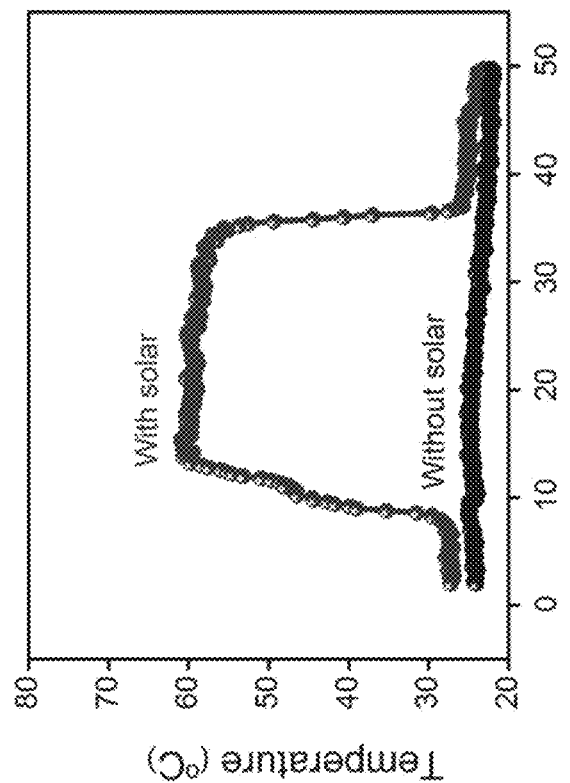
FIG. 20B shows surface temperature distribution of CHA of FIG. 19B under one sun irradiation.
Figure 20A:
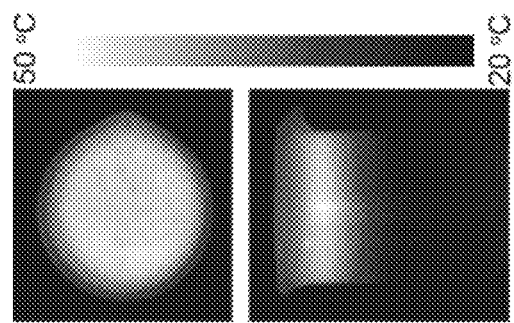
FIG. 20A shows IR images of top and side views of CHA of FIGS. 19B and 19C, respectively, under 1 kW $m^{-2}$ irradiation for 30 min.
Figure 20C:
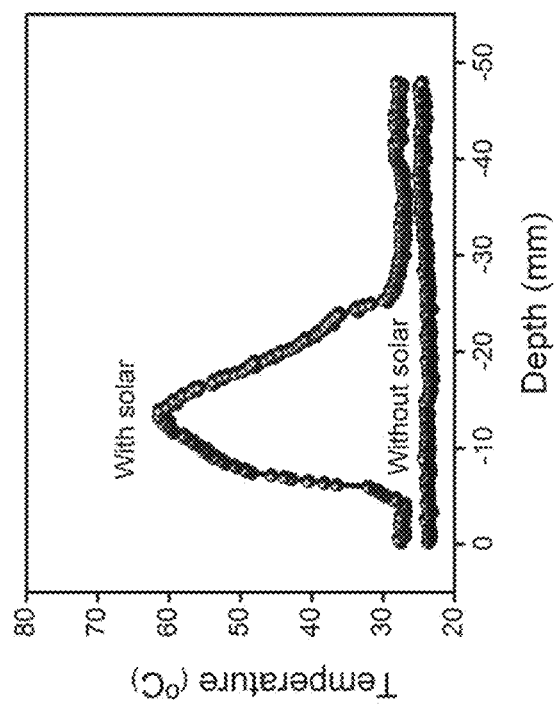
FIG. 20C shows temperature distribution along the vertical direction of CHA of FIG. 19C under one sun irradiation.

During the steam generation, converted heat could be inevitably lost to water and surrounding environment via three pathways: convective heat loss, conduction to bulk water, and thermal irradiation, which may weaken solar steaming efficiency. To study the heat loss from CHA upon solar steaming, an independent solar steam generation system is designed, which includes a CHA with a diameter of 20 mm and a thickness of 9 mm, freely floating on the surface of water contained in a glass beaker (internal diameter, 25 mm) (FIGS. 19B and 19C). As revealed by FIGS. 20A and 20B, the surface temperature of CHA increased to about 45° C. after 20 min of irradiation of 1 sun illumination, which is much higher than that of CHA without solar illumination. As shown in FIG. 20C, the temperature decreased obviously along with the depth of the evaporation system, which indicates that the generated heat is localized in network and heat loss to water is minimized.

Figure 21A:
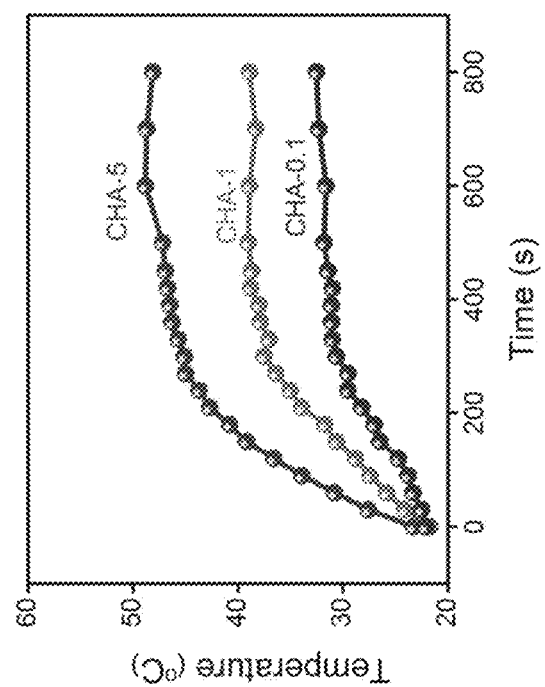
FIG. 21A shows temperature profiles of different CHA samples floating on water in a beaker under one sun irradiation (1 kW $m^{-2}$)
Figure 21B:
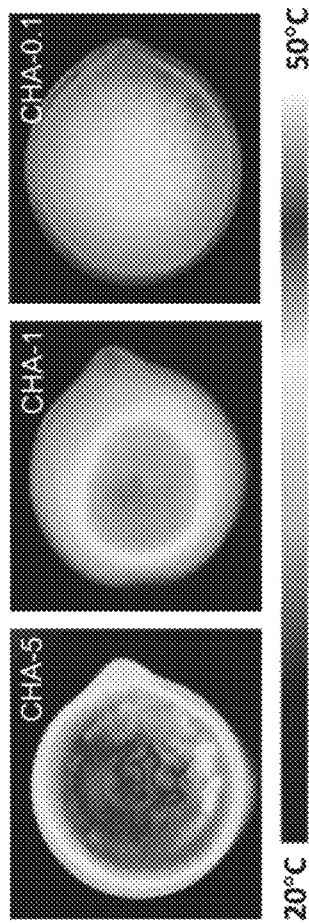
FIG. 21B shows IR images of CHA samples of FIG. 21A.
Figure 22A:
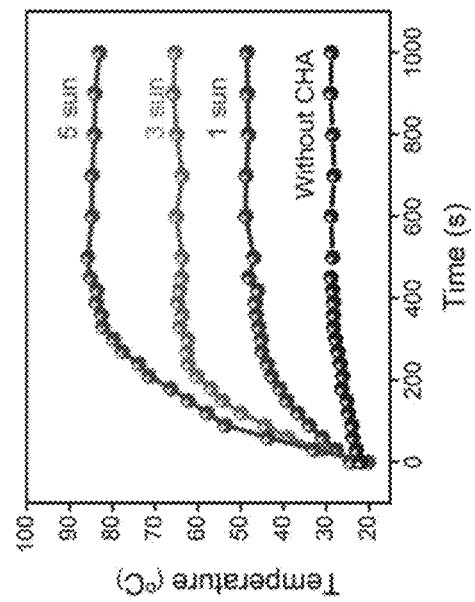
FIG. 22A shows temperature profiles of solar evaporation system (CHA with 5 wt % active carbon (CHA-5)) under various irradiation intensities and without CHA under one sun irradiation as a blank control.
Figure 22B:
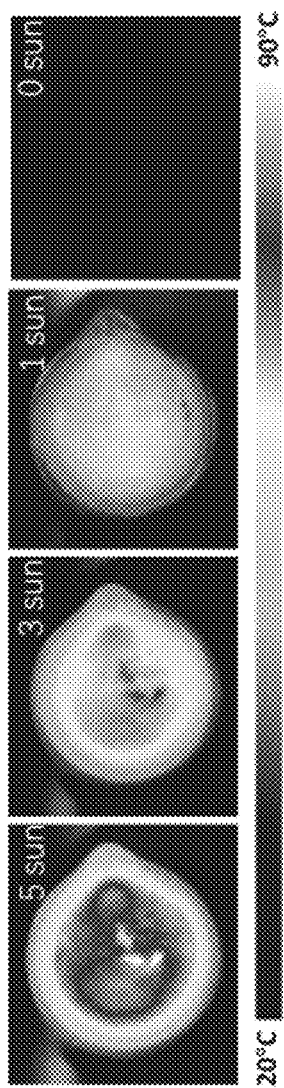
FIG. 22B shows IR images of CHA-5 floating on water in a beaker under various solar irradiation intensities.
Figure 22C:
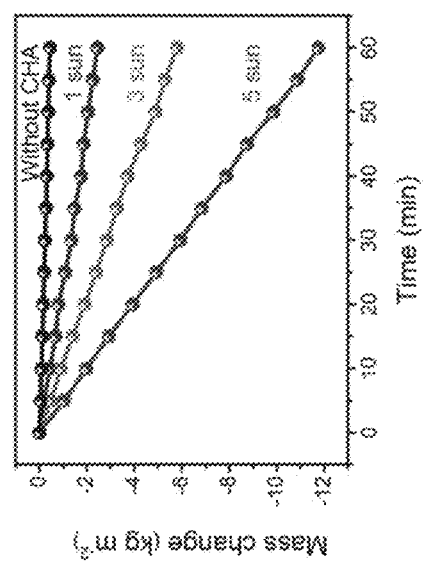
FIG. 22C shows mass loss of water for CHA-5 over time at various solar irradiation intensities, and without CHA under one sun irradiation as a blank control.
Figure 23B:
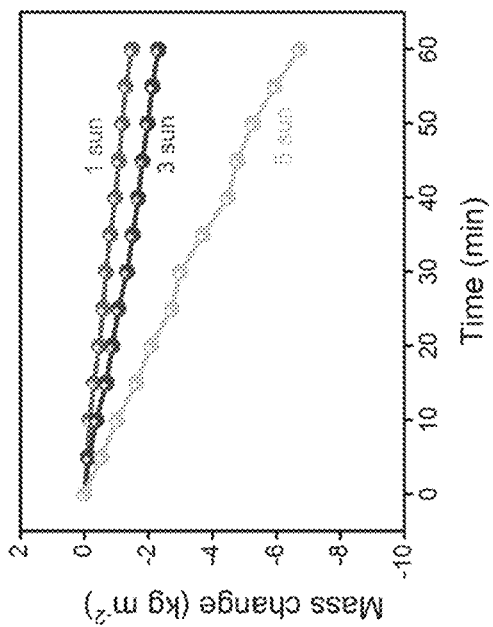
FIG. 23B shows mass loss of water for CHA-0.1 over time at various solar irradiation intensities.
Figure 23A:
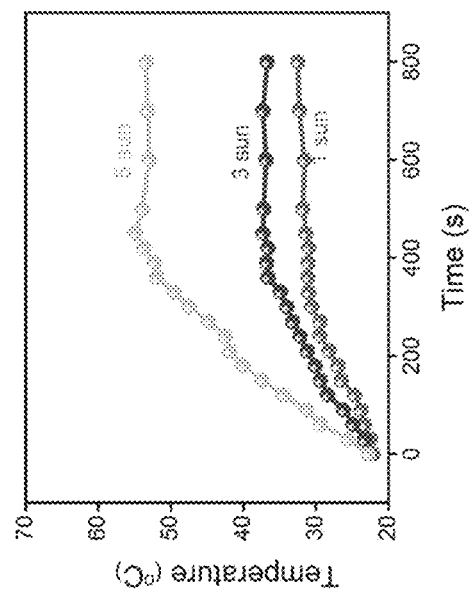
FIG. 23A shows change of surface temperature of CHA with 0.1 wt % active carbon (CHA-0.1) with time under different solar irradiation intensities.
Figure 23D:
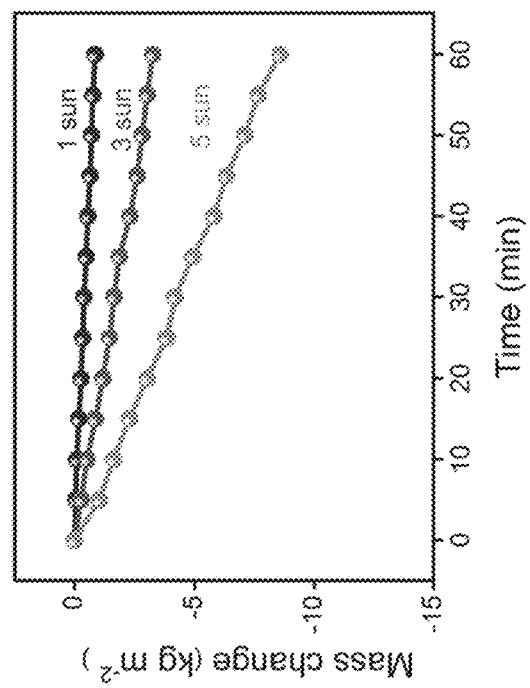
FIG. 23D shows mass loss of water for CHA-1 over time at various solar irradiation intensities.
Figure 23C:
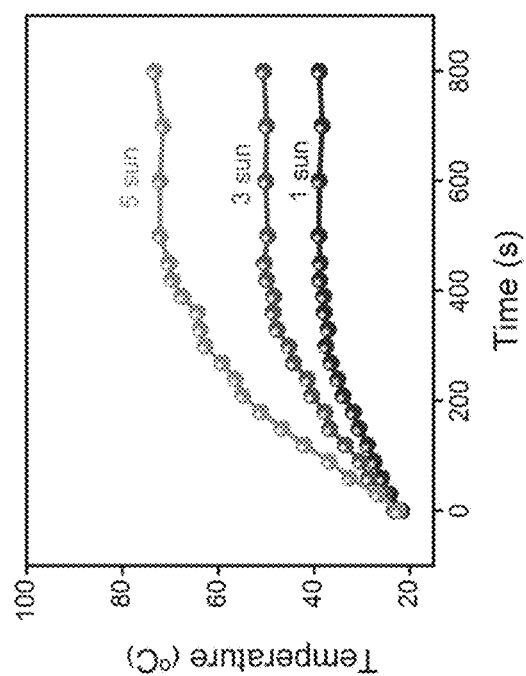
FIG. 23C shows change of surface temperature of CHA with 1 wt % active carbon (CHA-1) with time under different solar irradiation intensities.

PVA networks with different amounts of loading active carbon, including CHA-0.1 (0.1 wt % AC), CHA-1 (1 wt % AC), and CHA-5 (5 wt % AC), were prepared and their steam generation efficiency were studied. As shown in FIG. 21A, the surface temperatures of three samples increase rapidly after solar illumination (AM 1.5G) started. After about 5 min of solar illumination, it reached a stable stage (FIG. 21B). The temperature profiles and corresponding IR images of CHA-5 under irradiation with various power densities are shown in FIGS. 22A and 22B. The water evaporation rates of CHA-5 under different solar illuminations of 1, 3, and 5 sun were calculated to be 2.12, 5.45, and 11.25 kg m$^{-2}$ h$^{-1}$, respectively (FIG. 22C). The curves of time-dependent temperature increase and mass change of water of CHA-0.1 and CHA-1 under 1, 3, and 5 sun are shown in FIGS. 23A-23D. As could be calculated from the slopes of the curves, the evaporation rates are 0.87 (CHA-0.1), 1.54 (CHA-1), and 2.12 kg m$^{-2}$ h$^{-1}$ (CHA-5), which are 6.9, 12.3, and 16.9 times higher than that of blank PVA network without solar illumination, respectively.

Figure 24B:
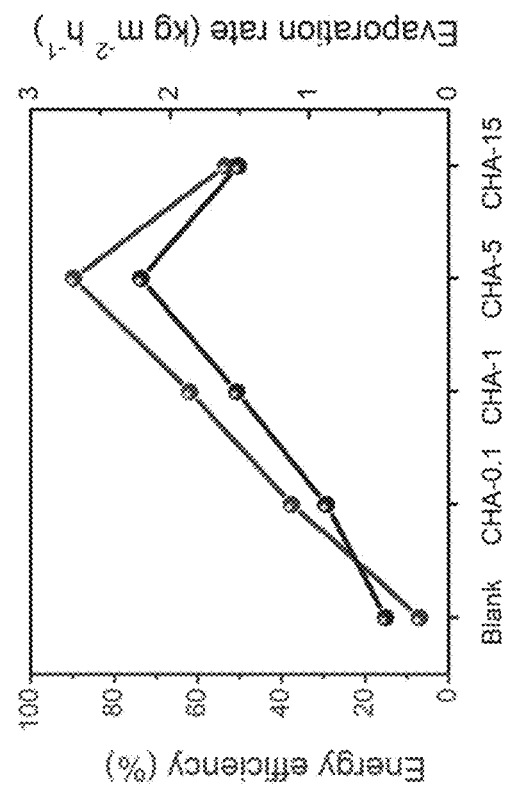
FIG. 24B shows evaporation rate and energy efficiency of different CHA samples under one sun optical density.
Figure 24A:
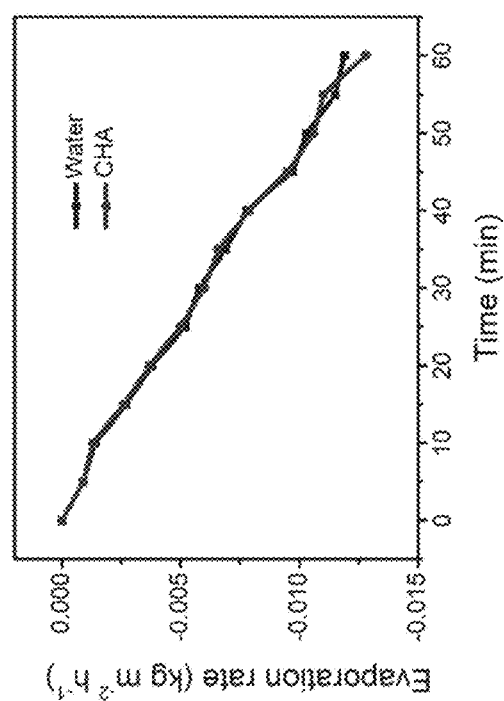
FIG. 24A shows evaporation rate of pure water and CHA under conditions with no light irradiation)
Figure 25B:
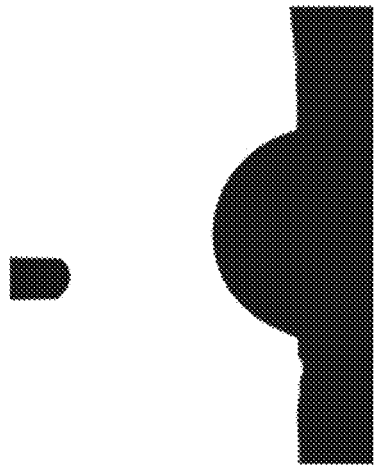
FIG. 25B shows an image illustrating water contact experiment of CHA-15 of FIG. 25A.
Figure 25A:
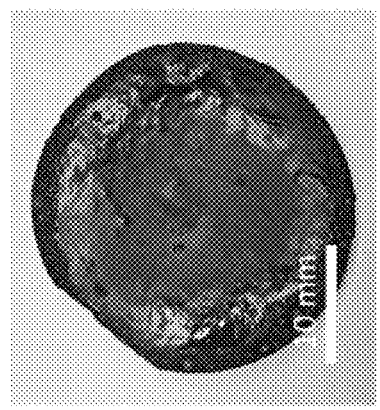
FIG. 25A shows an image of CHA with 15 wt % active carbon (CHA-15)
Figure 25D:
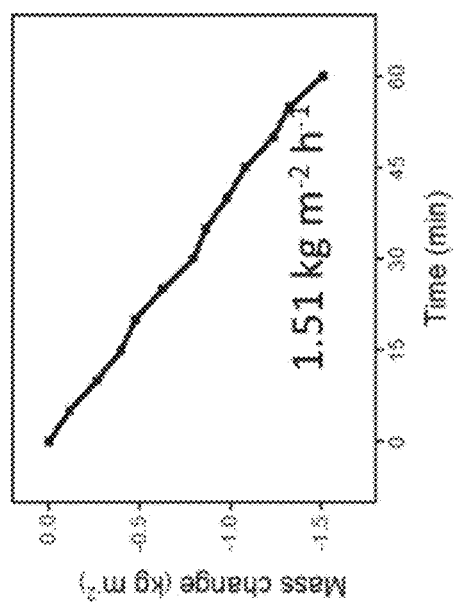
FIG. 25D shows mass loss of CHA-15 of FIG. 25A with time under 1 kW $m^{-2}$ solar irradiation with a solar simulator.
Figure 25C:
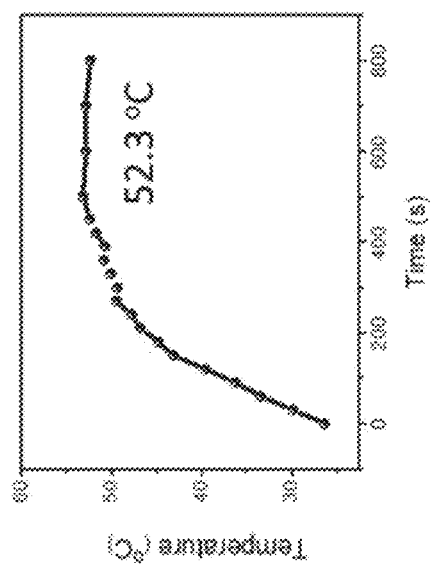
FIG. 25C shows temperature change of CHA-15 of FIG. 25A with time under 1 kW $m^{-2}$ solar irradiation with a solar simulator.

A blank control experiment was carried out by measuring the evaporation rate with and without solar irradiation (FIG. 24A). The CHA-5 shows the highest evaporation rate with an energy conversion efficiency of 89.8% under 1 sun irradiation (FIG. 24B). In this work, reported vaporization latent enthalpy method was used to evaluate the vaporization latent enthalpy and solar vapor conversion. (Li, X.; Li, J.; Lu, J.; Xu, N.; Chen, C.; Min, X.; Zhu, B.; Li, H.; Zhou, L.; Zhu, S.; Zhang, T.; Zhu, J. Enhancement of Interfacial Solar Vapor Generation by Environmental Energy. *Joule* 2018, 2, 1331-1338.) CHA with 15 wt % AC content shows less evaporation rate and energy efficiency (FIGS. 25A-25D). Based on the above, CHA-5 was chosen as the optimal ratio for AC content for further studies. A comparison of the evaporation rate and total cost with other reported works is listed in Table 2. In general, none of the reported material could achieve such a high evaporation rate with considerably low cost.

Figure 26B:
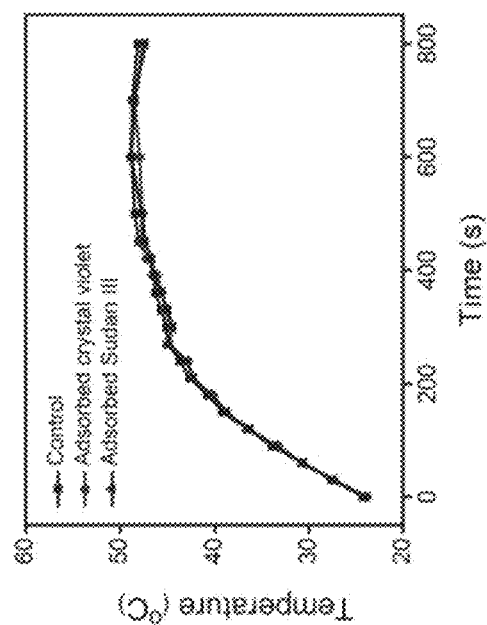
FIG. 26B shows temperature profiles of black CHA without organic contaminants adsorption, adsorbed with crystal violet, and Sudan III of FIG. 26A.
Figure 26A:
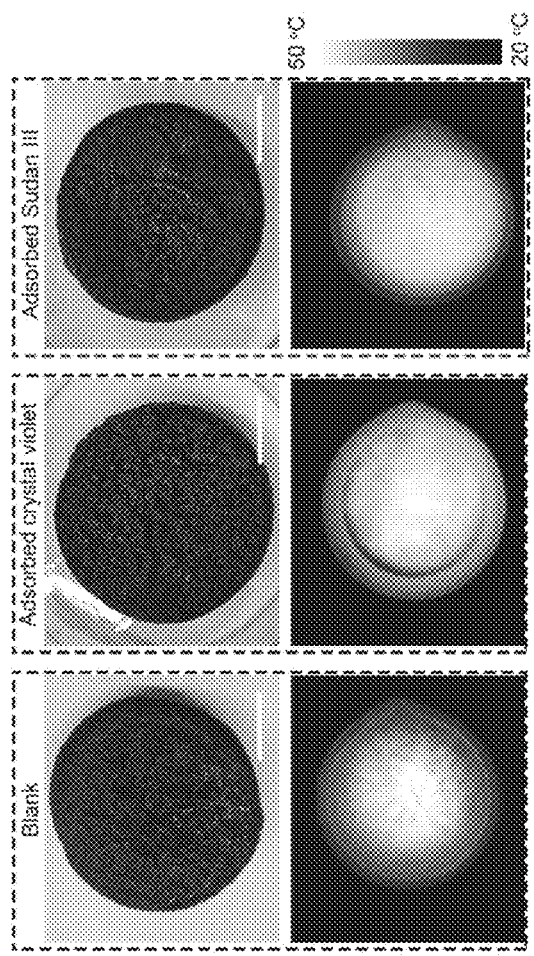
FIG. 26A shows images and corresponding IR images of blank CHA without organic contaminants adsorption, adsorbed crystal violet, and Sudan III in the process of solar evaporation process under on sun irradiation (1 kW $m^{-2}$, scale bar: 10 mm)
Figure 26D:
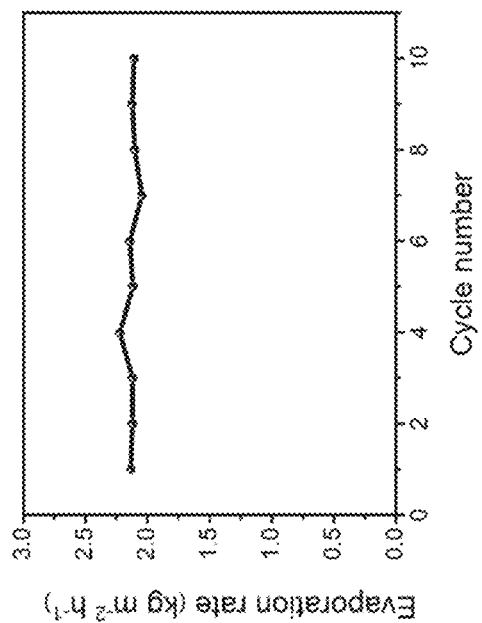
FIG. 26D shows evaporation stability of CHA after its adsorption or organic contaminants of FIG. 26A reached an adsorption equilibrium under one sun irradiation for ten cycle (each cycle lasted for one hour)
Figure 26C:
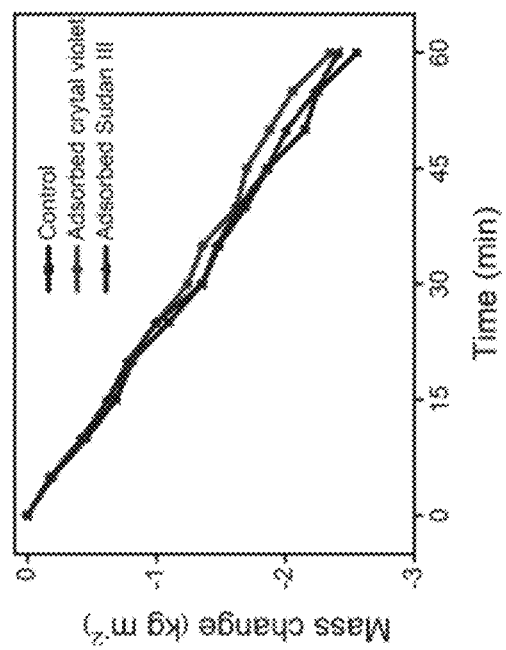
FIG. 26C shows mass loss of water for black CHA without organic contaminants adsorption, adsorbed with crystal violet, and Sudan III of FIG. 26A.

The solar evaporation performance of CHA after it adsorbed excess organic contaminants has been studied. The corresponding photographs and IR images of CHA without dye adsorption and adsorbed with crystal violet and Sudan III are shown in FIGS. 26A-26C. Under 1 sun irradiation, both CHA and dye-loaded CHA indicated the same temperature increment and similar solar-driven evaporation performance, which verifies that dye-loading has little influence on the solar evaporation rate and long-time stability of CHA (FIG. 26D).

Figure 27:
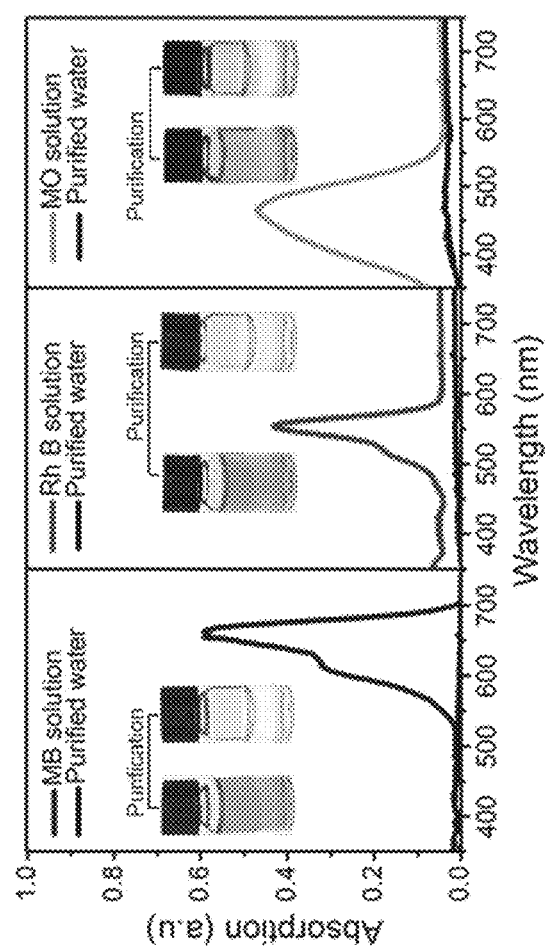
FIG. 27 shows absorption spectra of dye polluted water before and after purification by CHA. The inserts shows images of dye polluted water before and after purification. Said spectra and images were recorded after the same stimulated solar irradiation so as to exclude the possibility of dye degradation due to stimulated solar irradiation.
Figure 28B:
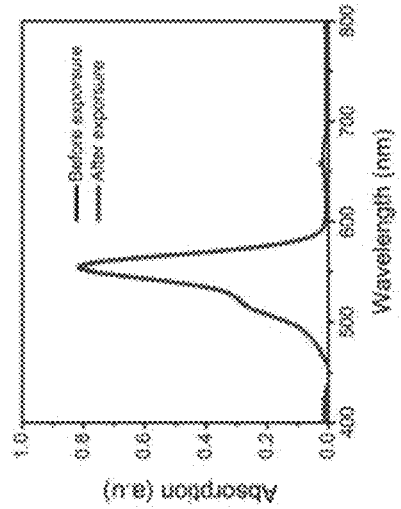
FIG. 28B shows absorption spectra of Rhodamine B before and after one sun irradiation for 2 hours.
Figure 28C:
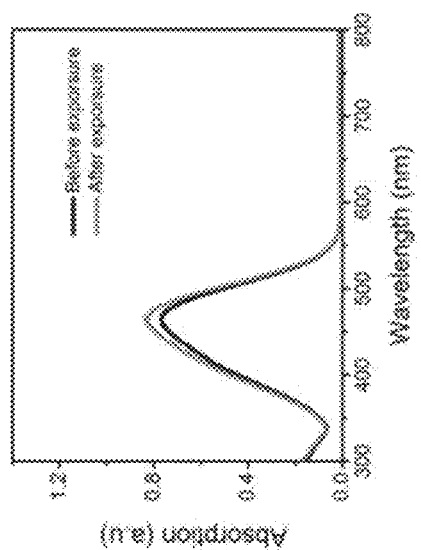
FIG. 28C shows absorption spectra of methyl orange before and after one sun irradiation for 2 hours.
Figure 28A:
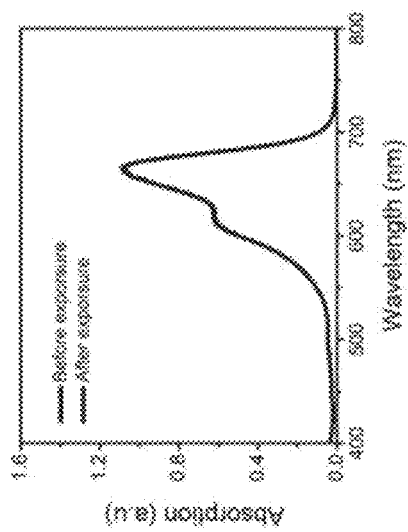
FIG. 28A shows absorption spectra of methyl blue before and after one sun irradiation for 2 hours.

The solar-driven purification ability of the CHA toward practical contaminated water has been evaluated. Three typical dyes, methylene blue (MB), Rhodamine B (Rh B), and methylene orange (MO), which are common in the textile industry were employed to prepare simulated wastewater samples. The absorption intensities of wastewater samples before and after the evaporation process were recorded, and the concentrations of the organic dyes were determined by using the standard absorption spectrum method. As shown in FIG. 27, the absorbance of the three dyes decreased dramatically in the purified water. Correspondingly, the dye solution turned substantially transparent after purification (FIG. 27, inserts). As a control, the photostability of the three dyes under 1 sun irradiation has been studied, and as revealed by FIGS. 28A-28C, these dyes remain stable after said irradiation.

Figure 29B:
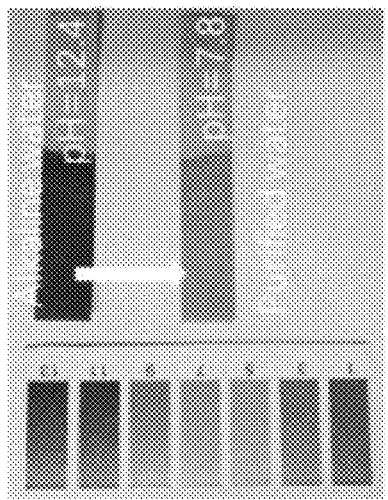
FIG. 29B shows an image of pH papers tested in alkaline water before and after purification by CHA.
Figure 29C:
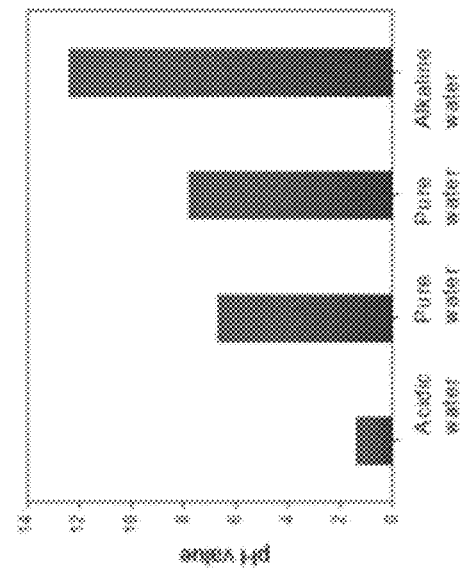
FIG. 29C shows change of pH values of acidic and alkaline water before and after purification by CHA, corresponding to FIGS. 29A and 29B, respectively.
Figure 29A:
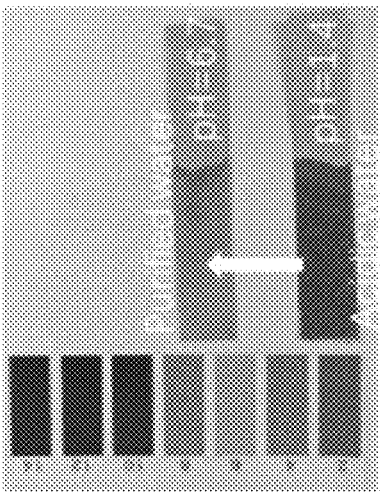
FIG. 29A shows an image of pH papers tested in acidic water before and after purification by CHA.

For other kinds of wastewater like acidic and alkaline solution, the CHA also exhibited good antifouling capacity. As illustrated in FIGS. 29A-29C, the pH values of the acidic and alkaline solutions resumed to about pH=7 after solar-driven purification by CHA. Inductively coupled plasma optical emission spectroscopy (ICP-OES) results showed that the concentrations of metal ions ($Fe^{3+}$, $Cu^{2+}$, $Cd^{2+}$, $Pb^{2+}$, $Zn^{2+}$, $Ni^{2+}$, $Al^{3+}$, $Se^{2+}$, $Mn^{2+}$, $Sn^{3+}$, $V^{5+}$, and $Li^+$) in water were reduced by 3 orders of magnitude via the evaporation process (FIG. 30A). The quality of the purified water has been evaluated by testing the metal ions concentrations ($Na^+$, $K^+$, $Mg^{2+}$, $Ca^{2+}$) after solar-driven seawater purification. After purification, the metal ions concentrations in the purified water were 0.7845 ($Na^+$), 0.4022 ($K^+$), 0.0319

TABLE 2

Comparison of evaporation rate and cost various solar steam generation materials under 1 sun irradiation

| Solar evaporation system | Evaporation rate (kg m$^{-2}$ h$^{-1}$) | Total cost ($ m$^{-2}$) | Reference |
|---|---|---|---|
| Salt-rejecting still | 0.6 | 3 | Energy Environ. Sci. 11 (2018) 1510-1519 |
| LASH | 3.6 | 293.21 | ACS Nano 13 (2019) 7913-919 |
| Micro-rafts | 0.95 | 31.4 | Sci. Adv. 3 (2017) 1602522-1602530 |
| HHNDL membrane | 1.65 | 41.5 | Adv. Mater. 29 (2017) 1702590-1702596 |
| Graphene films | 1.45 | 20 | Proc. Natl. Acad. Sci. U.S.A 113 (2016)13953-3958 |
| Black gold membranes | 0.67 | 6636 | Nat. Commun. 6 (2015) 10103-10111 |
| HNG | 3.2 | 98.83 | Nat. Nanotechnol. 13 (2018) 489-495 |
| Floating solar receiver | 0.5 | 54 | Nat. Energy 1 (2016) 16126-16127 |
| PPy nanosheets | 1.35 | 20 | Adv. Mater. 31 (2019) 1807716-1807724 |
| HHEs | 3.2 | 14.9 | Adv. Mater. 32 (2020) 1907061-1907068 |
| PPy origami | 2.12 | 22 | Adv. Mater. 31 (2019) 1900720-1900726 |
| Carbonized melamine | 1.27 | 3 | J. Mater. Chem. A 6 (2018) 4642-4648 |
| Carbon sponges | 1.98 | 12.5 | Nano Energy 58 (2019) 322-330 |
| MoS2/C @ PU | 1.95 | 33 | Adv. Energy Mater. 8 (2018) 1802108-1802118 |
| CHA | 2.12 | 4.08 | This work |

Figure 30B:
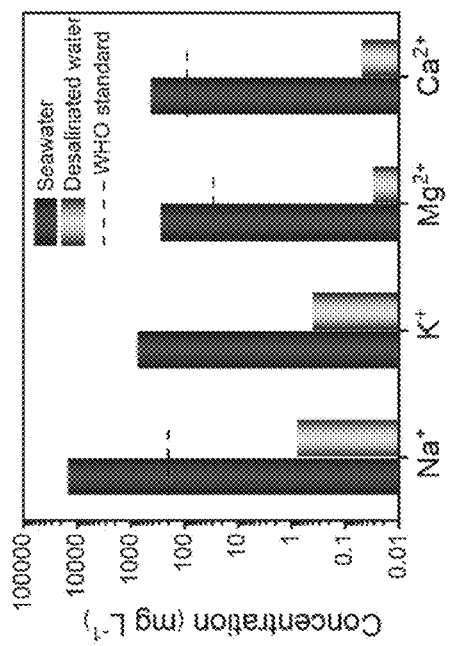
FIG. 30B shows ion concentrations of seawater before and after desalination through solar driven seawater purification by CHA.
Figure 30A:
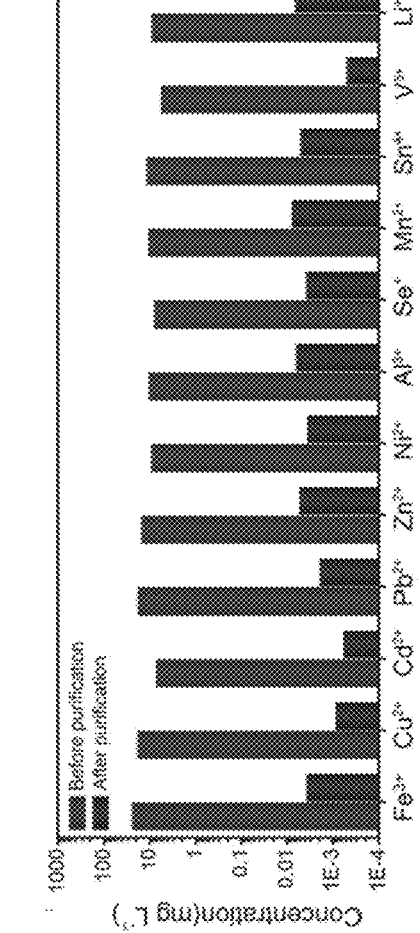
FIG. 30A shows removal performance of CHA toward different metal ions.
Figure 30C:
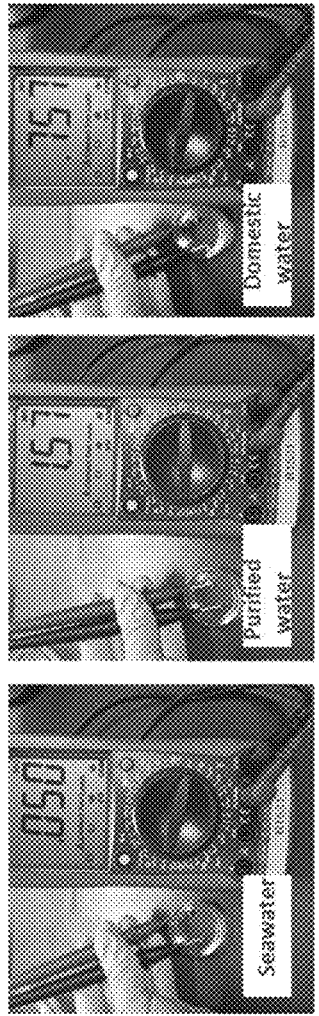
FIG. 30C shows images of electrical resistance measurements of seawater, purified water by CHA, and domestic water.

($Mg^{2+}$), and 0.0512 mg/L ($Ca^{2+}$), which meet the WHO standard of drinkable water (FIG. 30B). Meanwhile, the electrical resistance of purified water increased from 0.050 MΩ (seawater) to 1.57 MΩ (FIG. 30C), which is comparable to Type II water standard as defined by ASTM. These results confirm that the CHA has excellent purification performance.

Example 1G

Removal of Low-Boiling-Point Contaminants

Figure 31B:
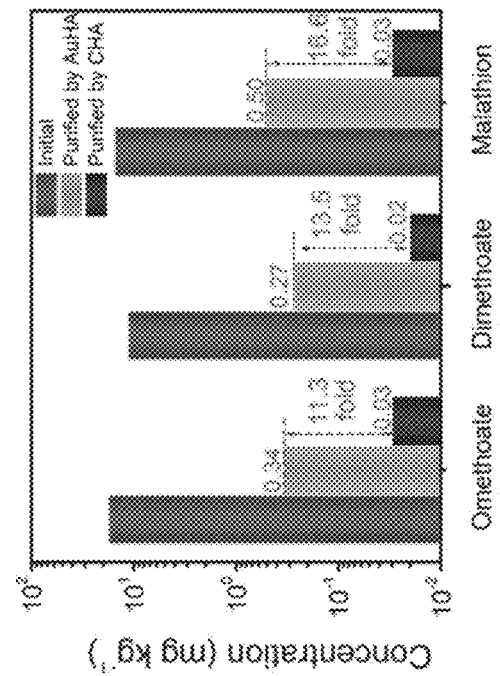
FIG. 31B shows removal efficiency of AuHA and CHA toward pesticides of FIG. 31A with solar evaporation.
Figure 31A:
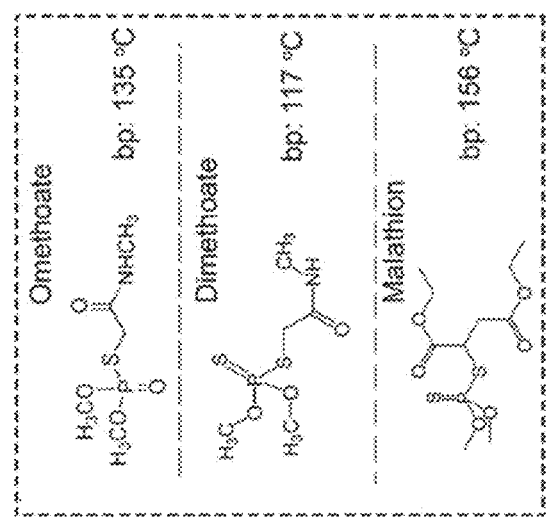
FIG. 31A shows molecular formula and boiling point of three kinds of pesticides.

The removal of low-boiling-point contaminants including pesticides and $Hg^{2+}$ ion in contaminated water was explored. Three pesticides omethoate, dimethoate, and amalathion with low boiling points of 135, 117, and 156° C., respectively, were dissolved in water with concentrations of 17.4, 11.4, and 15.3 mg $kg^{-1}$ (FIG. 31A). CHA samples with a diameter of 3 cm and a thickness of 0.5 cm were floated onto the 25 mL of contaminated water. Water samples were collected from the evaporated steam upon 1 sun irradiation for 2 h. As revealed by Table 3, the concentration of three pesticides remained substantially the same before and after irradiation. In addition, mass balance experiment conducted further on malathion indicates that the mass balance of malathion was maintained under irradiation (Table 4). Taken together, it indicates that the pesticides remained substantially stable and maintained a mass balance (i.e. did not decompose) under irradiation.

TABLE 3

Comparison of pesticide concentration before and after irradiation

| Pesticide species | Concentration before irradiation (mg/kg) | Concentration after irradiation (mg/kg) | Error bar (mg/kg) |
| --- | --- | --- | --- |
| Omethoate | 53.2 | 50.0 | 1.75 |
| Dimethoate | 25.9 | 22.4 | 1.26 |
| Malathion | 48.6 | 41.8 | 1.49 |

TABLE 4

The verification of mass balance of these pesticides during the solar evaporation process

| Pesticide species | Before evaporation (mg/kg) | After evaporation (mg/kg) | Adsorbed by CHA | Residual in bulk water (mg/kg) |
| --- | --- | --- | --- | --- |
| Malathion | 56.332 | 0.236 | 12.428 | 42.365 |

The same experiments were also carried out with a PVA framework embedded with gold nanoparticles instead of active carbon (hereafter referred as AuHA). As revealed by FIG. 31B, the pesticides in steam is efficiently removed by using CHA. However, water purified with AuHA still contains a substantial amount of pesticides because of its weak adsorption capacity. Moreover, this evaporation suppression effect was further applied to contaminated water with organic solvents (Table 5).

TABLE 5

Comparison of water purification performance by steaming of water solution of various organic solvents

| Organic solvent | Before purification (mg/L) | After purification by AuHA (mg/L) | After purification by CHA (mg/L) |
| --- | --- | --- | --- |
| Acetone | 165.35 | 6.55 | 0.99 |
| Ethanol | 156.88 | 5.20 | 0.75 |
| Isopropanol | 172.18 | 7.94 | 1.53 |
| Propanol | 105.99 | 13.09 | 6.66 |
| Tert-butyl alcohol | 145.80 | 49.74 | 11.03 |

Figure 32B:
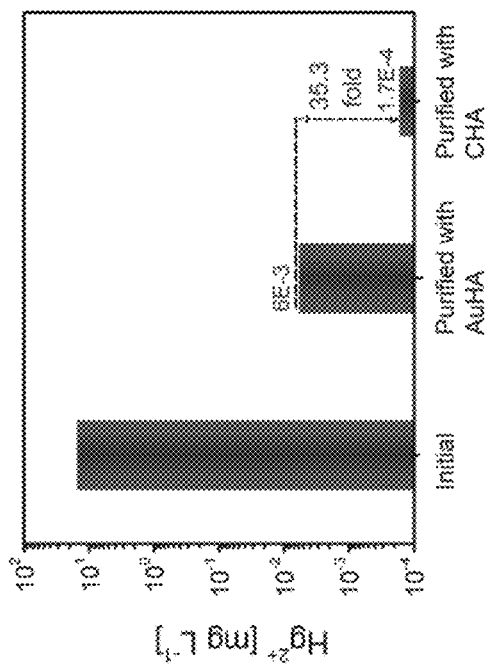
FIG. 32B shows mercury ion removal efficiency by AuHA and CHA through solar evaporation.
Figure 32A:
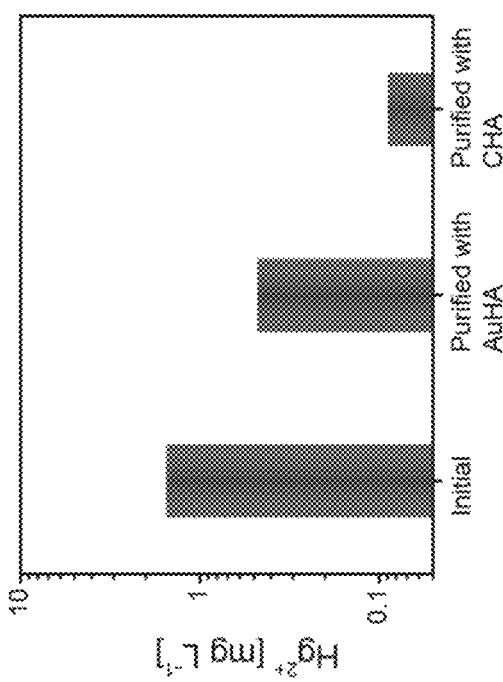
FIG. 32A shows mercury ion removal efficiency by AuHA and CHA through direct adsorption.

The elimination of mercury ion in steam by direct adsorption using CHA were investigated. Water (1.5 mL) with a $Hg^{2+}$ concentration of 1.54 mg $L^{-1}$ was dropped onto each of CHA and AuHA aerogel samples (~3 cm diameter, 0.5 cm thick). After 30 min of soaking, water was squeezed from the soaked aerogel samples. It is shown that [$Hg^{2+}$] in water squeezed from AuHA decreased to 0.48 mg $L^{-1}$, while CHA shows a much more effective removal of $Hg^{2+}$ to 0.09 mg $L^{-1}$ (FIG. 32A).

The efficiency of $Hg^{2+}$ removal of CHA under the synergetic action of adsorption and solar steaming has been investigated. A water sample with a much higher [$Hg^{2+}$] of 15.56 mg $mL^{-1}$ was used for this experiment. CHA and AuHA aerogel samples (~3 cm diameter, 0.5 cm thick) were, respectively, floated on 25 mL of the $Hg^{2+}$-contaminated water samples. Purified water samples were collected from the steam generated from the CHA and AuHA aerogels under 1 sun irradiation for 2 h. As shown in FIG. 32B, the synergetic action of adsorption and solar steaming is even more effective as compared with adsorption alone. Even the initial [$Hg^{2+}$] is much higher, the synergistically treated water samples contain much less [$Hg^{2+}$] (0.17 μg $L^{-1}$) compared with the case of direct adsorption alone. The CHA is much more effective compared to AuHA in eliminating $Hg^{2+}$. CHA can decrease the [$Hg^{2+}$] from 15.56 to 0.17 μg $L^{-1}$, with a 35-fold improvement compared with AuHA (6 μg $L^{-1}$).

Figure 33:
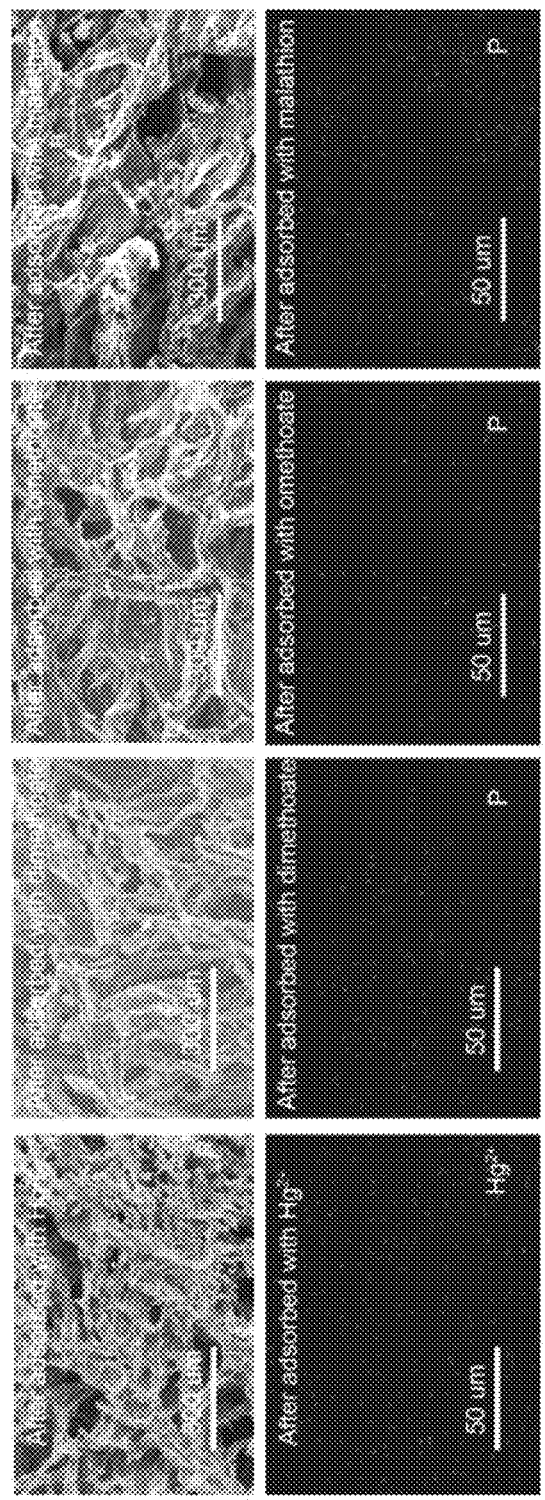
FIG. 33 shows SEM images and element mapping of CHA after adsorbed with $Hg^{2+}$, dimethoate, omethoate, and malathion.

The retention effect of CHA was confirmed by the fact that the CHA has a typical element residue in element determination and mapping of SEM after postevaporation of low-boiling-point contaminants (FIG. 33 and Table 6), which demonstrated the evaporation suppression effect.

TABLE 6

Summary of element content in CHA after adsorption various contaminants

| Composition (wt %) | CHA sample after purifying water contaminated with | | | | |
| --- | --- | --- | --- | --- | --- |
| | Pristine CHA | Hg ion | Dimethoate | Omethoate | Malathion |
| C | 56 | 58 | 58 | 56 | 55 |
| O | 40 | 39 | 36 | 41 | 42 |
| Cl | 3.58 | 2.12 | 5.58 | 2.39 | 1.77 |

TABLE 6-continued

Summary of element content in CHA after adsorption various contaminants

| Composition (wt %) | Pristine CHA | CHA sample after purifying water contaminated with | | |
| --- | --- | --- | --- | --- |
| | | Hg ion | Dimethoate | Omethoate | Malathion |
| Hg | — | 0.57 | — | — | — |
| P | — | — | 0.53 | 0.14 | 0.23 |

Example 1H

Scalable Production of Fresh Water

Figure 34:
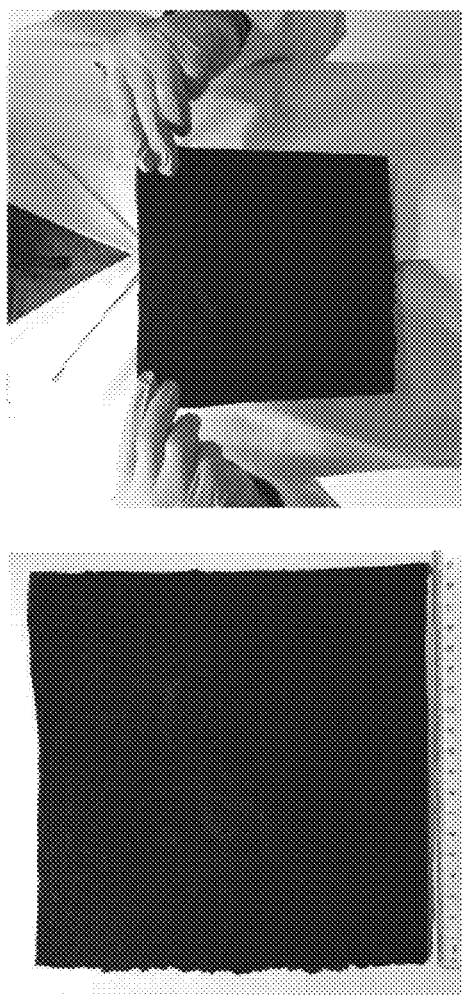
FIG. 34 shows images of a large-scale CHA with a dimension of 20 cm*20 cm.
Figure 35B:
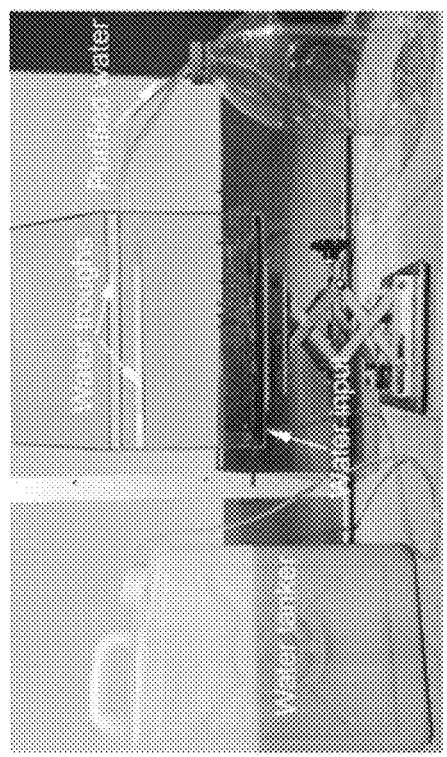
FIG. 35B shows an image of the actual setup of FIG. 35A.
Figure 35A:
FIG. 35A shows a schematic diagram of setup for outdoor water purification using the CHA of FIG. 34 according to an embodiment of the present invention.

A large-area panel of CHA device was achieved by a one-step modeling method with a dimension of 20 cm×20 cm for practical solar water purification (FIG. 34). The design and the components of the water purification device is illustrated in FIG. 35A. A wastewater tanker was connected to evaporation chamber (30 cm×20 cm) to transport wastewater to the solar evaporator. The prototype consists of a roof-like transparent panel (or a chamber with a roof-like structure) that allows light to transmit. The panel also allows vapor to be condensed thereon, to collect the condensate and to export the condensate via plastic piping (FIG. 35B). The solar-driven wastewater purification happens at the bottom of container; the water vapor will condense at the slope of the roof and naturally flow into the designed grooves on the side wall.

Figure 35C:
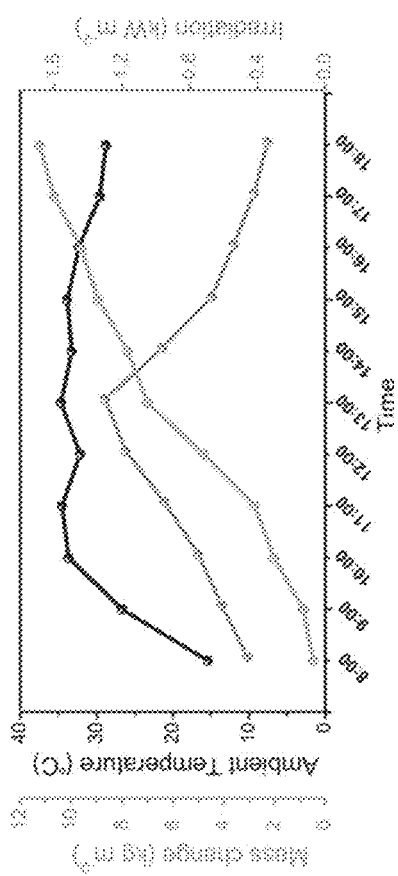
FIG. 35C shows measured results of contaminants removal and water purification by the setup of FIG. 35B under natural sunlight.

An outdoor water purification experiment was carried out on a sunny day. Evidently, condensed water was observed on the transparent PVC cover after 25 min under natural sunlight. The outdoor time-dependent solar intensity, ambient air temperature under the sun, and condensate produced by the prototype CHA reactor were illustrated in FIG. 35C. The maximum purified generation rate reached as high as 1.3 kg m$^{-2}$ h$^{-1}$, which is comparable with or higher than other reported work (Table 7).

TABLE 7

Summary of purified water collection rate under nature solar irradiation

| Solar evaporator | Water collection rate (kg m$^{-2}$ h$^{-1}$) | Reference |
| --- | --- | --- |
| CHA | 1.3 | This work |
| Al—Ti—O PVDF | 0.49 | Nano Energy 41(2017) 600-608 |
| Cu$_x$S/Cu foam | 0.52 | Nano Energy 69 (2020) 104465 |
| MF-PPy | 0.5-0.8 | Nano Energy 58 (2019) 322-330 |
| Hierarchical copper-silicon (HCS) | 0.7 | Nano Energy 60 (2019) 841-849 |
| AAM | 0.88 | Nat. Photonics 10 (2016) 10 393 |
| Plasmonic paper | 0.97 | J. Mater. Chem. AS (2017) 20044-20052 |
| LASH | 1.3 | Nat. Energy 1 (2016) 16126-16127 |
| HVAC | 1.6 | Nano Energy 67 (2020) 104255 |
| HNG | 1.61 | Nat. Nanotech. 13 (2018) 489-9 |
| PSH | 2.1 | Adv. Mater. 31 (2019) 1900720-1900726 |

Figure 36:
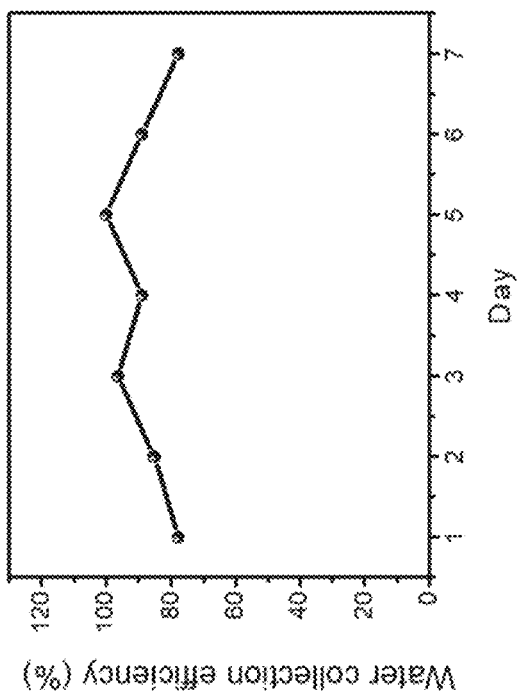
FIG. 36 shows stability of water collection efficiency of the setup of FIG. 35B over 7-day evaporation. Each cycle lasted for 10 h from 8:00 to 18:00.

Over the 10 h period, a total of 0.67 kg of water was obtained with a CHA of 600 cm$^2$, giving a figure of 11.2 kg/m$^2$ of water generation on a sunny day. The long-time outdoor test was carried out by measuring the water collection performance during 7 d; the water collection efficiency is shown in FIG. 36, indicating its stable outdoor water collection capacity. Additionally, the cost-effectiveness and scalability are important factors for practical applications. The market prices of PVA and active carbon are $13.2/kg and $0.81/kg, respectively. The total cost of this CHA prototype with a thickness of 0.5 cm was estimated to be around $4.08/m$^2$ (only materials cost was accounted).

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

All references specifically cited herein are hereby incorporated by reference in their entireties. However, the citation or incorporation of such a reference is not necessarily an admission as to its appropriateness, citability, and/or availability as prior art to/against the present invention.

What is claimed is:

1. A composite material for floating on providing purified water from a contaminated water source containing a low-boiling point contaminant, the composite material comprising a carbon-based aerogel including:
   A) a polymeric structure comprising a network of interconnected porous channels; and
   B) a carbonous material dispersed within and supported by the polymeric structure, the carbonous material comprising a functionalized surface,
   wherein the composite material has a density of less than 1 g/cm$^3$, such that the composite material is floatable on the surface of the contaminated water source, thereby enabling water purification of the contaminated water source, wherein the water purification is enabled by the polymeric structure which draws contaminated water from the contaminated water source into the polymeric structure via capillary action, and wherein the functionalized surface removes the low-boiling-point contaminant from the contaminated water to provide purified water.

2. The composite material of claim 1, wherein the network of interconnected porous channels comprises a first network of porous channels infiltrated with a second network of porous channels; and wherein the first network of porous channels comprises first network pores with a first pore size, and the second network of porous channels comprises second network pores with a second pore size, wherein the first pore size is at least about 20 times larger than the second pore size.

3. The composite material of claim 2, wherein the first pore size is from about 30 μm to about 150 μm.

4. The composite material of claim 2, wherein the second pore size is from about 0.1 μm to about 7.5 μm.

5. The composite material of claim 1, wherein the polymeric structure further comprises an evaporation region which is adapted to evaporate the purified water within the polymeric structure.

6. The composite material of claim 1, wherein the carbonous material is selected from the group consisting of active carbon, amorphous carbon, carbonized biomass, carbonized wood material, and a combination thereof.

7. The composite material of claim 1, wherein the functionalized surface comprises a functional group selected from the group consisting of a hydroxyl group, a carboxyl group, a carbonyl group, an amino group, and a combination thereof.

8. The composite material of claim 1, wherein the polymeric structure comprises a hydrophilic polymer, and wherein the hydrophilic polymer has a hydrophilic-lipophilic balance of at least 10.

9. The composite material of claim 8, wherein the hydrophilic polymer is selected from the group consisting of polyvinyl alcohol, poly(acrylamide), poly(ethylene glycol), poly-N-vinylpyrrolidone, polyurethanes, polyacrylic acid, polyethylene oxide, co-polymers of the foregoing, and combinations of the foregoing, including the co-polymers.

10. The composite material of claim 1, wherein the composite material comprises from about 0.1 wt % to about 5 wt % of the carbonous material.

11. The composite material of claim 1, wherein the composite material comprises a porosity greater than about 70%.

12. The composite material of claim 1, wherein the composite material comprises a specific surface area from about 1.0 $m^2g^{-1}$ to about 20 $m^2g^{-1}$.

13. A method for purifying water, comprising the steps of:
A) drawing, via capillary action, contaminated water from a contaminated water source into the composite material according to claim 1, wherein the contaminated water comprises a low-boiling-point contaminant;
B) applying radiation to the composite material to generate water vapor therefrom;
C) condensing the water vapor into water droplets; and
D) collecting the water droplets to form purified water.

14. The method of claim 13, wherein the low-boiling-point contaminant is selected from the group consisting of mercury ion, an organic solvent, an organic pesticide, and a combination thereof.

15. The method of claim 13, wherein step A) further comprises the step of capturing the low-boiling-point contaminant by the carbonous material of the composite material.

16. The method of claim 13, wherein the radiation comprises solar radiation selected from the group consisting of natural sun irradiation, artificial solar radiation, and a combination thereof.

17. The method of claim 16, wherein the solar radiation is generated by a solar simulator producing from about 1 sun irradiation unit to about 5 sun irradiation units.

18. The method of claim 13, wherein the contaminated water source further comprises an organic dye or metal ions other than mercury ion.

19. A kit for harvesting purified water, comprising:
A) a composite material according to claim 1;
B) a contaminated water unit; and
C) a purified water collecting unit.

* * * * *

UNITED STATES PATENT AND TRADEMARK OFFICE
CERTIFICATE OF CORRECTION

PATENT NO. : 12,157,683 B2  
APPLICATION NO. : 17/570756  
DATED : December 3, 2024  
INVENTOR(S) : Chun-Sing Lee et al.

Page 1 of 1

It is certified that error appears in the above-identified patent and that said Letters Patent is hereby corrected as shown below:

In the Claims

Claim 1, Column 24, Line 35 should read: 1. A composite material for providing purified Signed and Sealed this
Eleventh Day of February, 2025

Coke Morgan Stewart
*Acting Director of the United States Patent and Trademark Office*